United States Patent
Jung et al.

(10) Patent No.: US 11,592,825 B2
(45) Date of Patent: Feb. 28, 2023

(54) ELECTRONIC DEVICE AND OPERATION METHOD THEREFOR

(71) Applicant: SAMSUNG ELECTRONICS CO., LTD., Suwon-si (KR)

(72) Inventors: Jae-il Jung, Seongnam-Si (KR); Chan-jong Park, Seoul (KR); Lei Zhang, Yongin-Si (KR); Jun-ik Jang, Bucheon-Si (KR); Han-sung Lee, Yongin-Si (KR); Soon-hyuk Hong, Suwon-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 565 days.

(21) Appl. No.: 16/615,557

(22) PCT Filed: Aug. 7, 2018

(86) PCT No.: PCT/KR2018/008988
§ 371 (c)(1),
(2) Date: Nov. 21, 2019

(87) PCT Pub. No.: WO2019/031825
PCT Pub. Date: Feb. 14, 2019

(65) Prior Publication Data
US 2020/0174489 A1    Jun. 4, 2020

(30) Foreign Application Priority Data
Aug. 8, 2017  (KR) .................. 10-2017-0100435

(51) Int. Cl.
*G05D 1/02*    (2020.01)
*G06N 20/00*   (2019.01)
(Continued)

(52) U.S. Cl.
CPC ......... *G05D 1/0221* (2013.01); *G05D 1/0246* (2013.01); *G06N 5/04* (2013.01);
(Continued)

(58) Field of Classification Search
CPC .................................................. G05D 1/0221
See application file for complete search history.

(56) References Cited

U.S. PATENT DOCUMENTS 8,744,665 B2    6/2014  Shin et al.
9,008,840 B1    4/2015  Ponulak et al.
(Continued)

FOREIGN PATENT DOCUMENTS

CN      105511478       4/2016
DE   10 2015 119 501    5/2017
(Continued)

OTHER PUBLICATIONS

International Search Report dated Nov. 12, 2018 for PCT/KR2018/008988 and English-language translation.
(Continued)

*Primary Examiner* — Michael A Berns
(74) *Attorney, Agent, or Firm* — Nixon & Vanderhye, P.C.

(57) ABSTRACT

An electronic apparatus and an operating method are provided. The electronic apparatus includes a storage, at least one sensor, and at least one processor configured to execute stored instructions to while the electronic apparatus is moving, capture a surrounding image by using the at least one sensor, when an unable-to-move situation occurs while the electronic apparatus is moving, generate context data including a surrounding image captured within a predetermined time from a time when the unable-to-move situation has occurred, store, in the storage, the generated context data corresponding to the unable-to-move situation having
(Continued)

occurred, and learn the stored context data by using one or more data recognition models.

13 Claims, 18 Drawing Sheets

(51) Int. Cl.
*G06N 5/04* (2023.01)
*G06V 10/40* (2022.01)
*G06V 10/70* (2022.01)
*G06V 20/10* (2022.01)
*G06V 40/20* (2022.01)

(52) U.S. Cl.
CPC ............ *G06N 20/00* (2019.01); *G06V 10/40* (2022.01); *G06V 10/768* (2022.01); *G06V 20/10* (2022.01); *G06V 40/20* (2022.01); *G05D 2201/0203* (2013.01)

(56) References Cited

U.S. PATENT DOCUMENTS

| | | | |
|---|---|---|---|
| 9,953,648 B2 | 4/2018 | Choi et al. | |
| 9,983,592 B2 | 5/2018 | Hong et al. | |
| 10,349,798 B2 * | 7/2019 | Jun | G01S 17/00 |
| 10,394,249 B2 | 8/2019 | Kim et al. | |
| 10,469,754 B2 * | 11/2019 | Nagashima | G01C 15/002 |
| 10,624,517 B2 | 4/2020 | Jung | |
| 11,269,342 B2 * | 3/2022 | Kim | A47L 11/4011 |
| 11,327,475 B2 * | 5/2022 | Cella | H04L 1/18 |
| 2016/0167226 A1 | 6/2016 | Schnittman | |
| 2020/0174489 A1 * | 6/2020 | Jung | G06V 10/768 |

FOREIGN PATENT DOCUMENTS

| | | |
|---|---|---|
| EP | 3 076 845 | 10/2016 |
| KR | 10-2009-0057881 | 6/2009 |
| KR | 10-2014-0126539 | 10/2014 |
| KR | 10-2016-0022769 | 3/2016 |
| KR | 10-2016-0097966 | 8/2016 |
| KR | 10-2016-0132748 | 11/2016 |
| WO | 2015/084078 | 6/2015 |
| WO | 2016/028021 | 2/2016 |
| WO | 2016/123421 | 8/2016 |
| WO | 2016/129912 | 8/2016 |

OTHER PUBLICATIONS

Written Opinion dated Nov. 12, 2018 for PCT/KR2018/008988 and English-language translation.
Extended Search Report dated Feb. 3, 2020 in European Patent Application No. 18844791.6.
Notice of Non-final Rejection dated Dec. 23, 2021 in Korean Patent Application No. 10-2017-0100435 and English-language translation.
Communication pursuant to Article 94(3) EPC dated Aug. 14, 2020 in counterpart EP Application No. 18844791.6.
Notice of Allowance dated Jun. 23, 2022 in KR Application No. 10-2017-0100435 and English-language translation.

* cited by examiner

NEURAL NETWORK

ELECTRONIC DEVICE AND OPERATION METHOD THEREFOR

This application is the U.S. national phase of International Application No. PCT/KR2018/008988 filed 7 Aug. 2018, which designated the U.S. and claims priority to KR Patent Application No. 10-2017-0100435 filed 8 Aug. 2017, the entire contents of each of which are hereby incorporated by reference.

BACKGROUND

Field

The disclosure relates to electronic apparatuses and operating methods thereof. More particularly, the disclosure relates to electronic apparatuses and methods of assisting movement of a robot.

In addition, the disclosure relates to an artificial intelligence (AI) system for simulating functions of a human brain, such as cognition and judgment, by using a machine learning algorithm, such as deep learning, and application technology of the AI system.

Description of Related Art

An artificial intelligence (AI) system is a computer system that implements human-level intelligence, and unlike an existing rule-based smart system, allows a machine to learn by itself, make decisions, and become smarter. As the AI system is used, the AI system improves its recognition rate and accurately understands a user's preference, and thus, the existing rule-based smart system is gradually being replaced with a deep-learning-based AI system.

AI technology includes machine learning (deep learning) and element technologies using machine learning.

Machine learning is an algorithmic technique that classifies/learns characteristics of input data by itself, and element technologies are technologies that use a machine-learning algorithm, such as deep learning, and include technical fields, such as linguistic understanding, visual understanding, inference/prediction, knowledge representation, operation control, and so forth.

The AI technology is employed in various fields. For example, linguistic understanding is a technique that recognizes, and applies/processes human languages/texts, and includes natural language processing, machine interpretation, a conversation system, question and answer processing, voice recognition/synthesis, and so forth. Visual understanding is a technique that recognizes and processes an object in the same manner as a human visual system, and includes object recognition, object tracking, image searching, people recognition, scene understanding, space understanding, image enhancement, and the like. Inference/prediction is a technique that determines information and performs logical inference and prediction based thereon, and includes knowledge/probability-based inference, optimization prediction, preference-based planning/recommendation, and so forth. Knowledge representation is a technique that automatizes human experience information as knowledge data, and includes knowledge establishment (data creation/classification), knowledge management (data utilization), and the like. Operation control is a technique that controls autonomous driving of a vehicle and motion of a robot, and includes motion control (navigation, collision, driving), manipulation control (action control), and so forth.

SUMMARY

An aspect of the disclosure is to provide electronic apparatuses and methods of assisting movement of a robot.

Another aspect of the disclosure is to provide a non-transitory computer-readable recording media having recorded thereon a program for performing, when executed by a computer, the methods of assisting movement of a robot.

In accordance with an aspect of the disclosure, an electronic apparatus is provided. The electronic apparatus includes a storage, at least one sensor, and at least one processor configured to execute stored instructions to while the electronic apparatus is moving, capture a surrounding image by using the at least one sensor, when an unable-to-move situation occurs while the electronic apparatus is moving, generate context data including a surrounding image captured within a predetermined time from a time when the unable-to-move situation has occurred, store, in the storage, the generated context data corresponding to the unable-to-move situation having occurred, and learn the stored context data by using one or more data recognition models.

DETAILED DESCRIPTION

Figure 1:
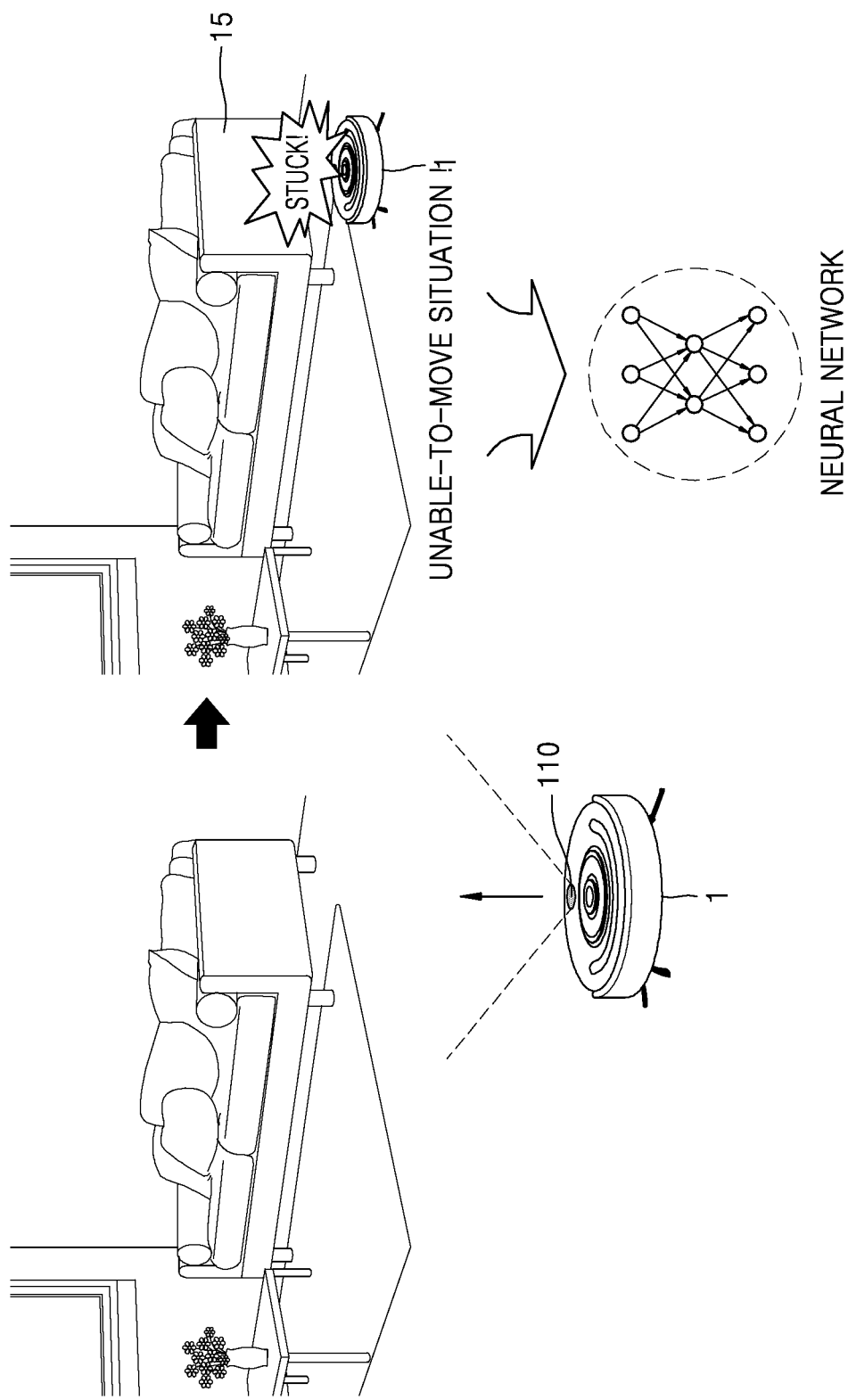
FIG. 1 is a diagram illustrating a procedure of how an electronic apparatus for assisting movement of a robot operates according to an embodiment of the disclosure.

In accordance with an aspect of the disclosure, an electronic apparatus is provided. The electronic apparatus includes a storage, at least one sensor, and at least one processor configured to execute stored instructions to while the electronic apparatus is moving, capture a surrounding image by using the at least one sensor, when an unable-to-move situation occurs while the electronic apparatus is moving, generate context data including a surrounding image captured within a predetermined time from a time when the unable-to-move situation has occurred, store, in the storage, the generated context data corresponding to the unable-to-move situation having occurred, and learn the stored context data by using one or more data recognition models.

In accordance with another aspect of the disclosure, an electronic apparatus is provided. The electronic apparatus includes a storage configured to store context data including a surrounding image and location information regarding where the surrounding image has been captured, the context data corresponding to each of a plurality of unable-to-move situations, at least one sensor, and at least one processor configured to execute stored instructions to while the electronic apparatus is moving, obtain a surrounding image and location information by using the at least one sensor, by using the one or more data recognition models, determine whether or not the surrounding image and the location information obtained while the electronic apparatus is moving match the context data stored in the storage, and when the surrounding image and the location information obtained while the electronic apparatus is moving match the context data, estimate that the unable-to-move situation corresponding to the matched context data occurs.

In accordance with another aspect of the disclosure, an operating method of an electronic apparatus is provided. The method includes, while the electronic apparatus is moving, capturing a surrounding image, when an unable-to-move situation occurs while the electronic apparatus is moving, generating context data including a surrounding image captured within a predetermined time from a time when the unable-to-move situation has occurred, storing the generated context data corresponding to the unable-to-move situation having occurred, and learning the stored context data by using one or more data recognition models.

In accordance with another aspect of the disclosure, at least one non-transitory computer-readable recording medium is provided. The non-transitory computer-readable recording medium includes a recording medium having recorded thereon a program for performing, when executed by a computer, the method of an electronic apparatus.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Throughout the disclosure, when a part "includes" an element, it is to be understood that the part additionally includes other elements rather than excluding other elements as long as there is no particular opposing recitation. In addition, the terms, such as " . . . unit", "-or", "module", or the like used in the disclosure indicate an unit which processes at least one function or motion, and the unit may be implemented as hardware or software or by a combination of hardware and software.

Embodiments will now be described more fully with reference to the accompanying drawings so that those of ordinary skill in the art may practice the embodiments without any difficulty. However, the various embodiments may have different forms and should not be construed as being limited to the descriptions set forth herein.

Hereinafter, various embodiments will be described with reference to the accompanying drawings.

A robot 1 (FIGS. 1 and 17) described herein may include an electronic apparatus 100 (FIGS. 15 to 17) for assisting or controlling movement of the robot 1 (hereinafter referred as the electronic apparatus 100). The electronic apparatus 100 according to an embodiment may be included in the robot 1 (e.g., a robot cleaner) to operate and thus may autonomously move.

FIG. 1 is a diagram illustrating a procedure of how an electronic apparatus for assisting movement of a robot operates according to an embodiment of the disclosure.

Referring to FIG. 1, while the robot 1 autonomously moving moves according to an embodiment of the disclosure, an unable-to-move situation may occur. The unable-to-move situation according to an embodiment may be a situation in which the robot 1 including the electronic apparatus 100 stops moving due to an external element (e.g., being stuck due to a material, a shape, and a curve of the floor, a structure, and the like) contacted while autonomously moving and is unable to restart moving via autonomous control by the robot 1.

For example, while moving, the robot cleaner may become unable to move any longer due to a material or a shape of the floor, or may happen to enter underneath furniture, such as a chair and be stuck and thus may become unable to move any longer.

The electronic apparatus 100 according to an embodiment may move while capturing a surrounding image by using a sensor 110 (FIGS. 15 and 16), and when an unable-to-move situation in which the electronic apparatus 100 is stuck underneath a structure 15 (e.g., a chair) and is unable to move any longer occurs, may learn the unable-to-move situation by using a data recognition model based on a neural network, such as a deep neural network (DNN). By learning the unable-to-move situation, the electronic apparatus 100 may pre-estimate occurrence of the unable-to-move situation before the same unable-to-move situation occurs subsequently, and may move by changing a moving path to prevent occurrence of the unable-to-move situation.

According to an embodiment of the disclosure, through learning of an unable-to-move situation, the electronic apparatus 100 may control a moving operation to predict and avoid the unable-to-move situation and thus may provide a safer and more efficient robot movement environment.

Figure 2:
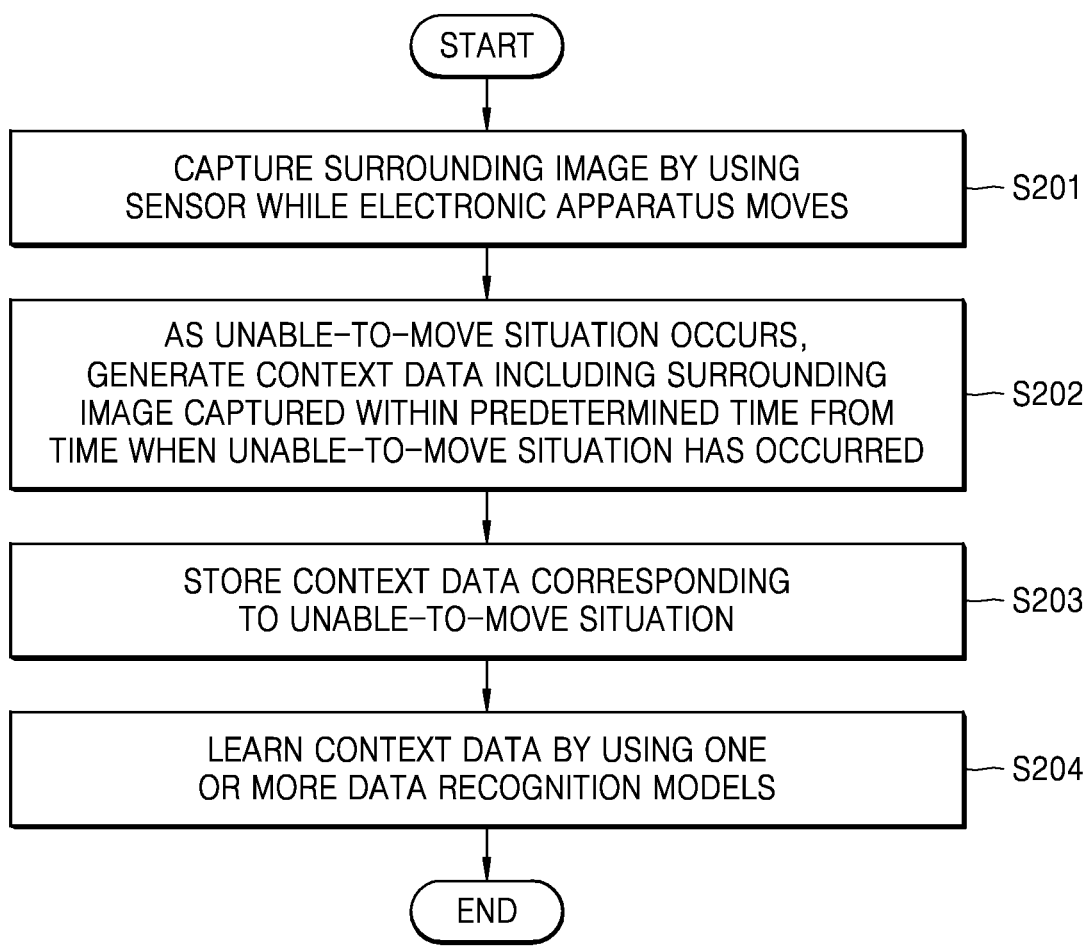
FIG. 2 is a flowchart of an operating method of an electronic apparatus according to an embodiment of the disclosure.

FIG. 2 is a flowchart of an operating method of an electronic apparatus according to an embodiment of the disclosure.

Figure 3:
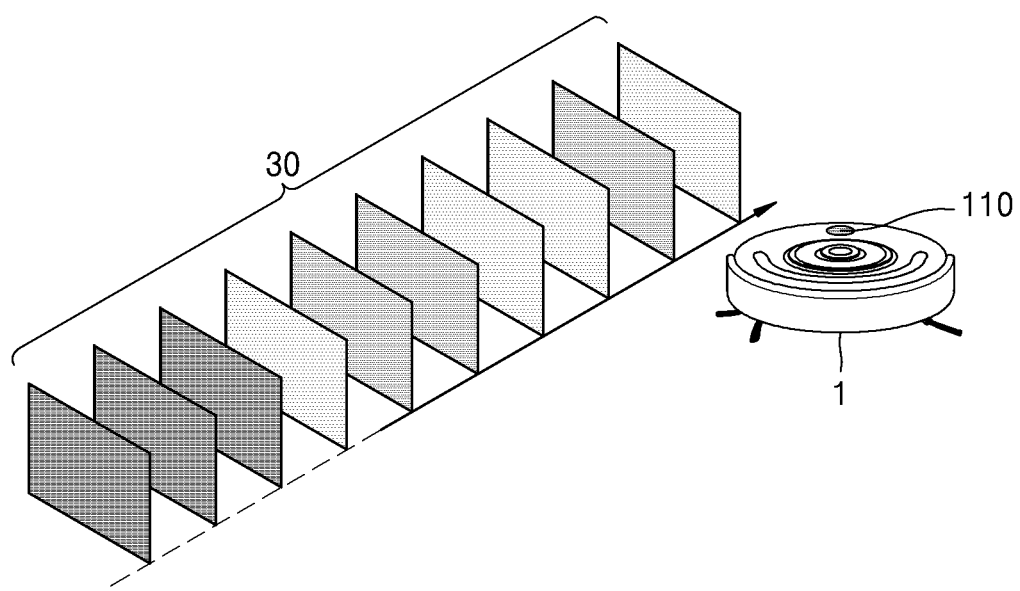
FIG. 3 is a diagram illustrating a procedure of capturing a surrounding image according to an embodiment of the disclosure.

FIG. 3 is a diagram illustrating a procedure of capturing a surrounding image according to an embodiment of the disclosure.

Figure 4:
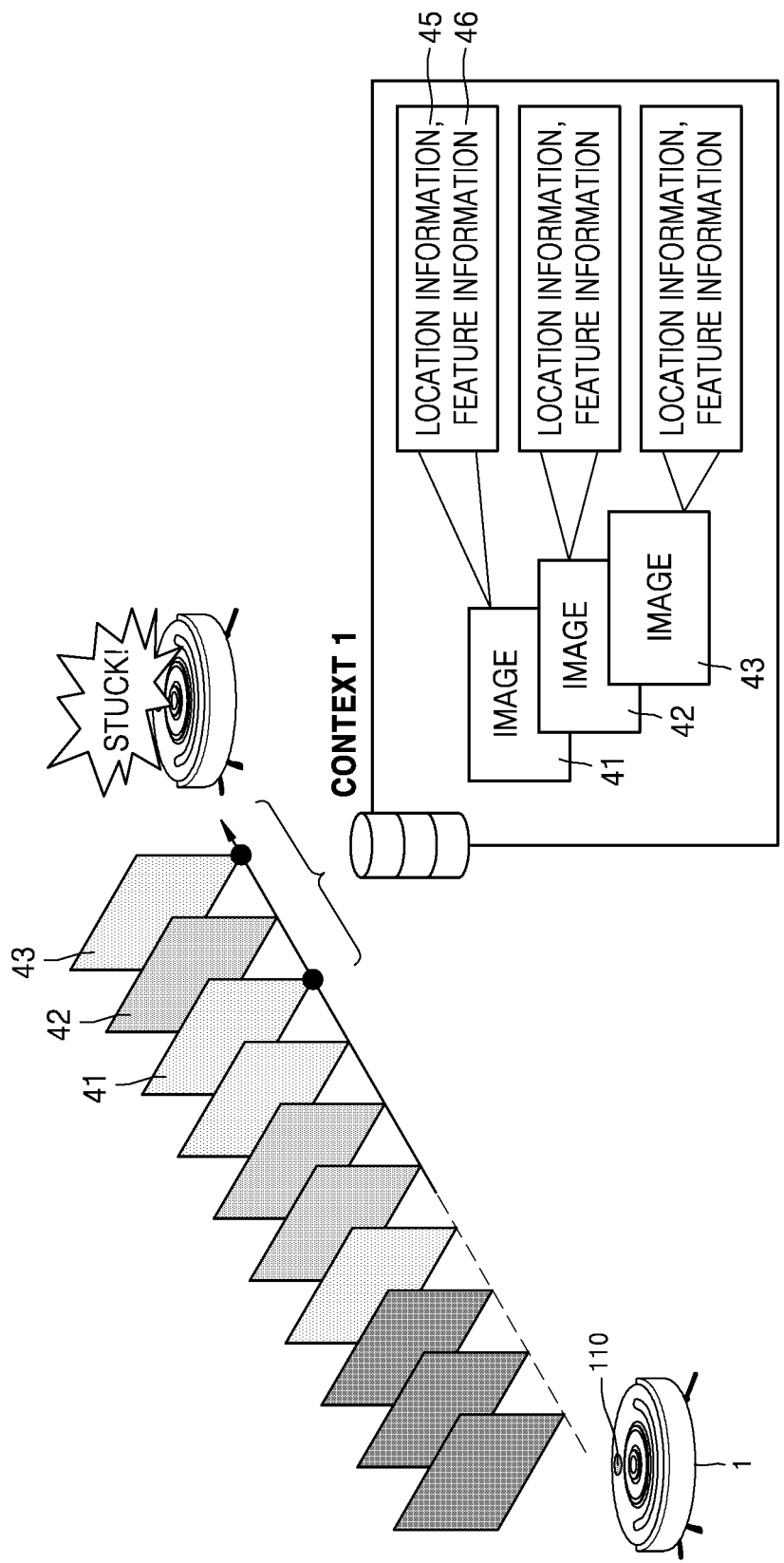
FIG. 4 is a diagram illustrating a procedure of generating context data according to an embodiment of the disclosure.

FIG. 4 is a diagram illustrating a procedure of generating context data according to an embodiment of the disclosure. The flowchart of FIG. 2 will be described with reference to the diagrams of FIGS. 3 and 4.

Referring to FIG. 2, in operation S201, the electronic apparatus 100 according to an embodiment may capture a surrounding image by using the sensor 110 (FIG. 16) while the electronic apparatus 100 moves. The sensor 110 (FIG. 16) according to an embodiment may include an image sensor 228 (FIG. 16) capable of capturing an image.

Referring to FIG. 3, while the robot 1 moves, a processor 120 (FIG. 15) of the electronic apparatus 100 may control the sensor 110 to obtain a plurality of image frames 30 while capturing a front image.

According to an embodiment of the disclosure, the processor 120 of the electronic apparatus 100 may extract a plurality of keypoints from an obtained plurality of image frames. Using the keypoints extracted from the image frames, the processor 120 may generate an image descriptor having image data converted into vector data. The processor 120 may store the image descriptor in a storage unit 140.

According to an embodiment of the disclosure, in FIGS. 9 and 10 described below, during image matching, a matching method using the image descriptor may be used, and an image matching method is not limited thereto.

According to an embodiment of the disclosure, the processor 120 may control a surrounding image captured while the robot 1 moves to be stored in a temporary storage area of the storage unit 140, and when a preset capacity is exceeded, may control the oldest image data to be deleted first.

In operation S202 of FIG. 2, as an unable-to-move situation occurs during moving, the electronic apparatus 100 according to an embodiment may generate context data including the surrounding image captured within a predetermined time from a time when the unable-to-move situation has occurred.

Referring to FIG. 4, when an unable-to-move situation occurs while the electronic apparatus 100 moves, context data including image frames 41, 42, and 43 captured in a predetermined time range from a time when the unable-to-move situation has occurred (e.g., within one minute from the time when the unable-to-move situation has occurred) may be generated.

Figure 15:
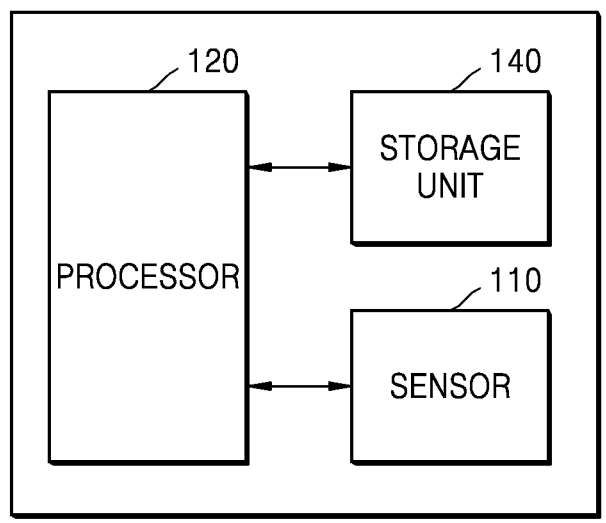
FIG. 15 is a block diagram of an electronic apparatus according to an embodiment of the disclosure.

In operation S203 of FIG. 2, the electronic apparatus 100 according to an embodiment may store context data corresponding to the unable-to-move situation in the storage unit 140 (FIG. 15).

For example, referring to FIG. 4, context data including the image frames 41, 42, and 43 corresponding to an unable-to-move situation (context 1) may be stored.

In addition, by using the sensor 110 (FIG. 16) capable of sensing location information, the electronic apparatus 100 according to an embodiment may obtain location information indicating a location of the electronic apparatus 100 while the electronic apparatus 100 moves.

Referring to FIG. 4, the electronic apparatus 100 may obtain respective pieces of location information corresponding to times when the image frames 41, 42, and 43 are captured during moving. For example, the electronic apparatus 100 may store context data further including location information 45 corresponding to each image frame 41.

In addition, the electronic apparatus 100 according to an embodiment may extract feature information from each of the obtained image frames 41, 42, and 43. According to an embodiment of the disclosure, the electronic apparatus 100 may store context data further including feature information 46 (FIG. 4) extracted from each image frame 41 (FIG. 4).

For example, feature information may be identification information for identifying an object included in an image (e.g., furniture, a structure, and the like, included in the image).

In addition, for example, feature information may be information regarding a relative distance and direction with respect to a point where a plurality of image frames have been captured and a point where an unable-to-move situation has occurred.

In addition, for example, feature information may be path information indicating a moving path estimated from a captured surrounding image.

The processor 120 (FIG. 15) of the electronic apparatus 100 according to an embodiment may store context data generated according to an unable-to-move situation, in an area different from the temporary storage area of the storage unit 140 where a surrounding image captured during robot moving is stored. The processor 120 may store context data corresponding to the unable-to-move situation in a permanent storage area of the storage unit 140 to prevent the context data from being arbitrarily deleted.

In operation S204 of FIG. 2, the electronic apparatus 100 according to an embodiment may learn context data by using one or more data recognition models.

According to an embodiment of the disclosure, the processor 120 of the electronic apparatus 100 may learn context data corresponding to the unable-to-move situation by using a data recognition model based on a neural network.

According to an embodiment of the disclosure, the processor 120 may learn image data corresponding to the unable-to-move situation and an image descriptor converted from the image data.

In addition, according to an embodiment of the disclosure, the processor 120 may generate a virtual image, based on surrounding image data corresponding to the unable-to-move situation, by using a data recognition model, and may learn context data further including the virtual image. Generation of the virtual image will be described below with reference to FIGS. 5 and 6.

In addition, according to an embodiment of the disclosure, the processor 120 may decide entry point information including an image frame and location information corresponding to an entry point leading to a point where the unable-to-move situation has occurred, based on context data corresponding to the unable-to-move situation, by using a data recognition model. The processor 120 may learn context data further including the entry point information by using the data recognition model. The entry point information will be described below with reference to FIGS. 7 and 8.

In addition, according to an embodiment of the disclosure, the processor 120 may compare descriptors respectively extracted from a plurality of image frames by using a data recognition model, and may learn a relationship between the descriptors. The processor 120 may generate context data further including relationship information between a plurality of descriptors.

According to an embodiment of the disclosure, the processor 120 may learn context data and thus may modify and refine a data recognition model. FIGS. 1 to 4 are illustrated to describe an embodiment of the disclosure, and the disclosure is not limited thereto.

Figure 5:
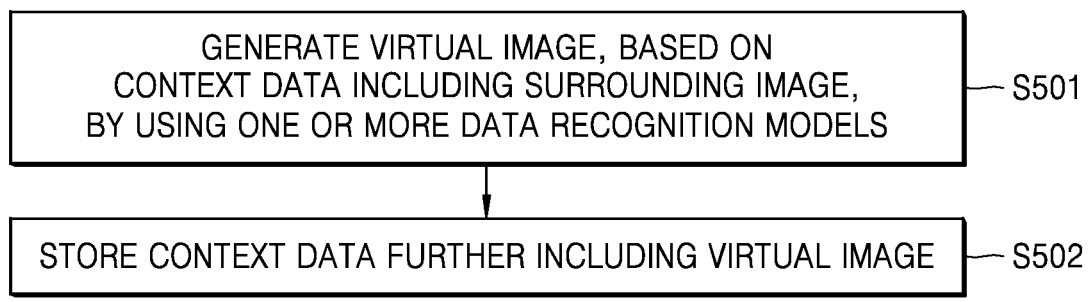
FIG. 5 is a flowchart illustrating a procedure of generating a virtual image according to an embodiment of the disclosure.

FIG. 5 is a flowchart illustrating a procedure of generating a virtual image according to an embodiment of the disclosure.

Figure 6:
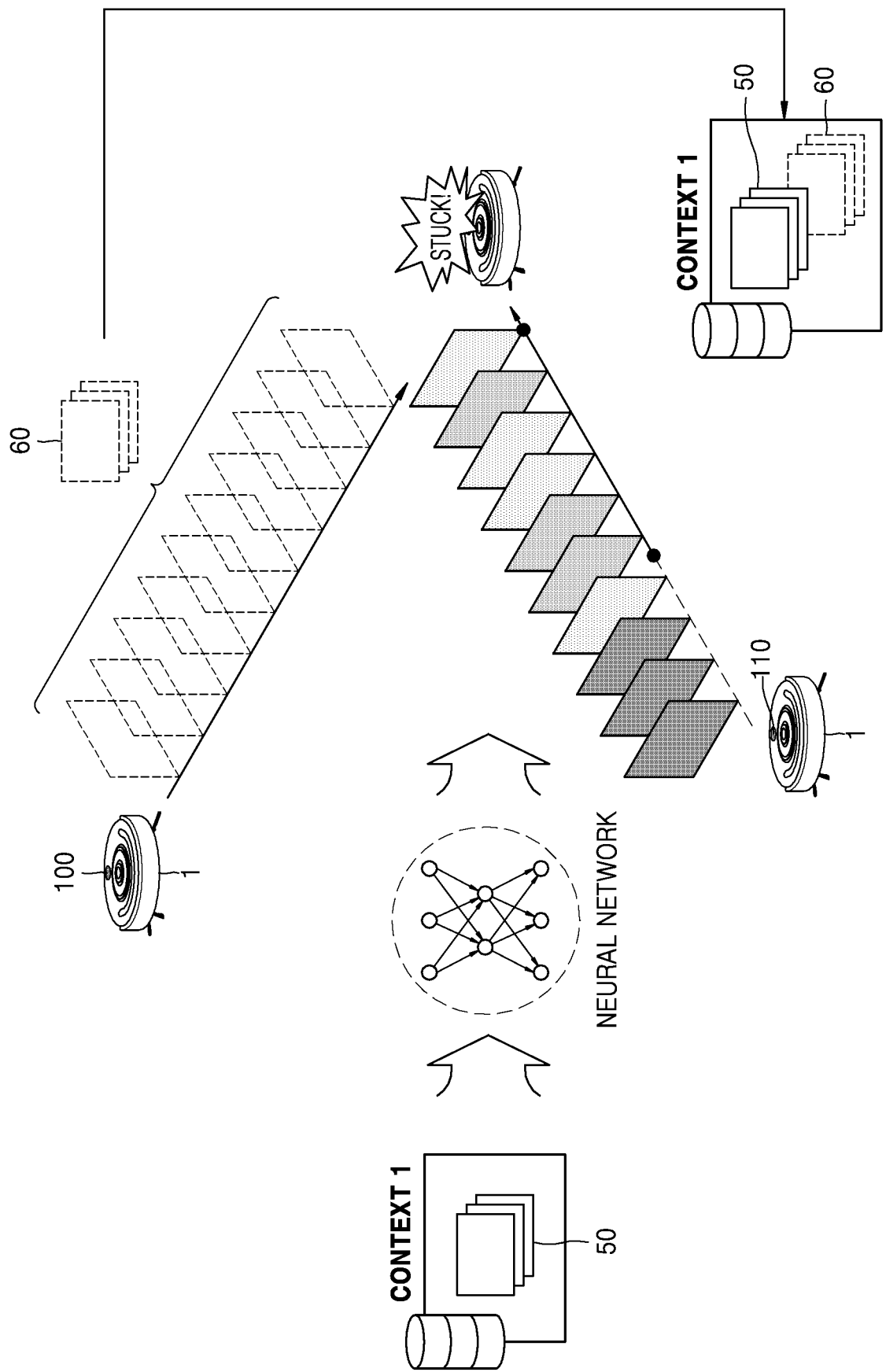
FIG. 6 is a diagram illustrating a procedure of generating a virtual image according to an embodiment of the disclosure.

FIG. 6 is a diagram illustrating a procedure of generating a virtual image according to an embodiment of the disclosure. The flowchart of FIG. 5 will be described with reference to the diagram of FIG. 6.

Referring to FIG. 5, in operation S501 of FIG. 5, the electronic apparatus 100 according to an embodiment may generate a virtual image, based on context data including a surrounding image, by using one or more data recognition models.

According to an embodiment of the disclosure, a virtual image may be an image estimated to be obtained when a point where an unable-to-move situation corresponding to context data has occurred is approached from a different direction.

Referring to FIG. 6, based on a plurality of image frames 50 included in context data (context 1), the electronic apparatus 100 may assume and generate a virtual image frame 60 that may be obtained when the robot 1 is assumed to approach a point where an unable-to-move situation has occurred from a different direction.

In addition, for example, a plurality of virtual image frames may be an image frame estimated to be obtained when a point where an unable-to-move situation has occurred is approached in an environment having different brightness.

In addition, for example, a plurality of virtual image frames may be an image generated assuming that an area except a structure within an image frame is different, based on the assumption that a structure collided with at a point where an unable-to-move situation has occurred is placed on a different location.

In operation S502 of FIG. 5, the electronic apparatus 100 according to an embodiment may store context data further including the virtual image in the storage unit 140 (FIG. 15). In addition, the processor 120 according to an embodiment may learn context data further including the virtual image by using a data recognition model.

FIGS. 5 and 6 illustrate generating a virtual image according to an embodiment of the disclosure.

Figure 7:
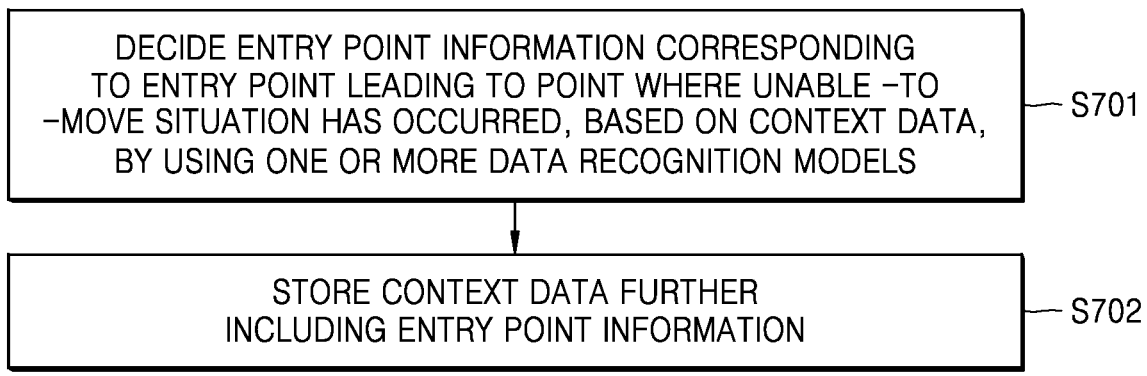
FIG. 7 is a flowchart illustrating a procedure of deciding entry point information according to an embodiment of the disclosure.

FIG. 7 is a flowchart illustrating a procedure of deciding entry point information according to an embodiment of the disclosure.

Figure 8:
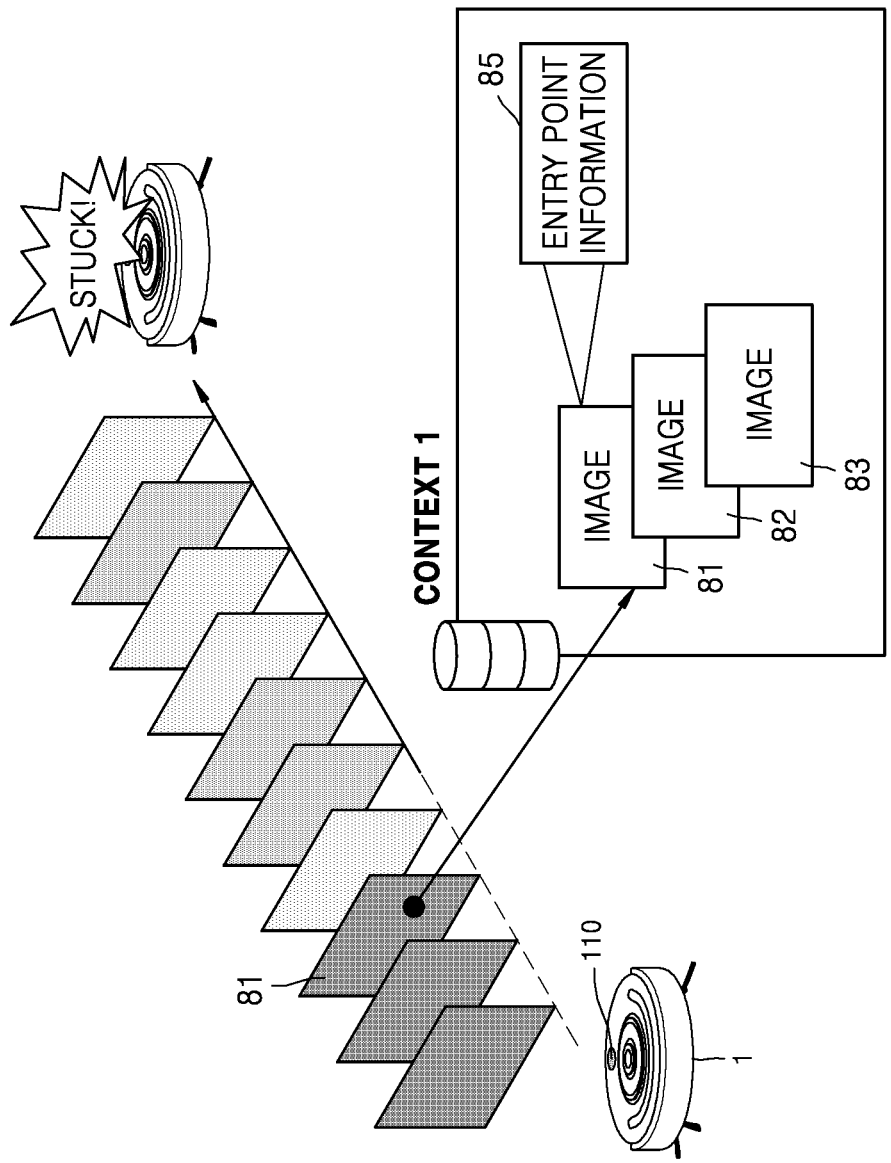
FIG. 8 is a diagram illustrating a procedure of deciding entry point information according to an embodiment of the disclosure.

FIG. 8 is a diagram illustrating a procedure of deciding entry point information according to an embodiment of the disclosure. The flowchart of FIG. 7 will be described with reference to the diagram of FIG. 8.

Referring to FIG. 7, according to an embodiment of the disclosure, by analyzing an entry point where an unable-to-move situation inevitably is to occur after a few seconds as the robot 1 enters a certain space during moving, the robot 1 may be controlled to avoid the entry point in a different direction. In operation S701 of FIG. 7, the electronic apparatus 100 according to an embodiment may decide entry point information corresponding to an entry point leading to a point where an unable-to-move situation has occurred, based on context data, by using one or more data recognition models.

Referring to FIG. 8, for example, the processor 120 may decide an image frame 81 corresponding to an entry point that is the cause of leading to a point where an unable-to-move situation has occurred, from among a plurality of image frames 81, 82, and 83 corresponding to the unable-to-move situation.

The processor 120 may decide entry point information 85 including information for identifying an image frame corresponding to an entry point and location information of the entry point.

In operation S702 of FIG. 7, the electronic apparatus 100 according to an embodiment may store context data further including entry point information in the storage unit 140 (FIG. 15). In addition, the processor 120 according to an embodiment may learn context data further including entry point information by using a data recognition model.

FIGS. 7 and 8 illustrate deciding entry point information according to an embodiment of the disclosure.

Figure 9:
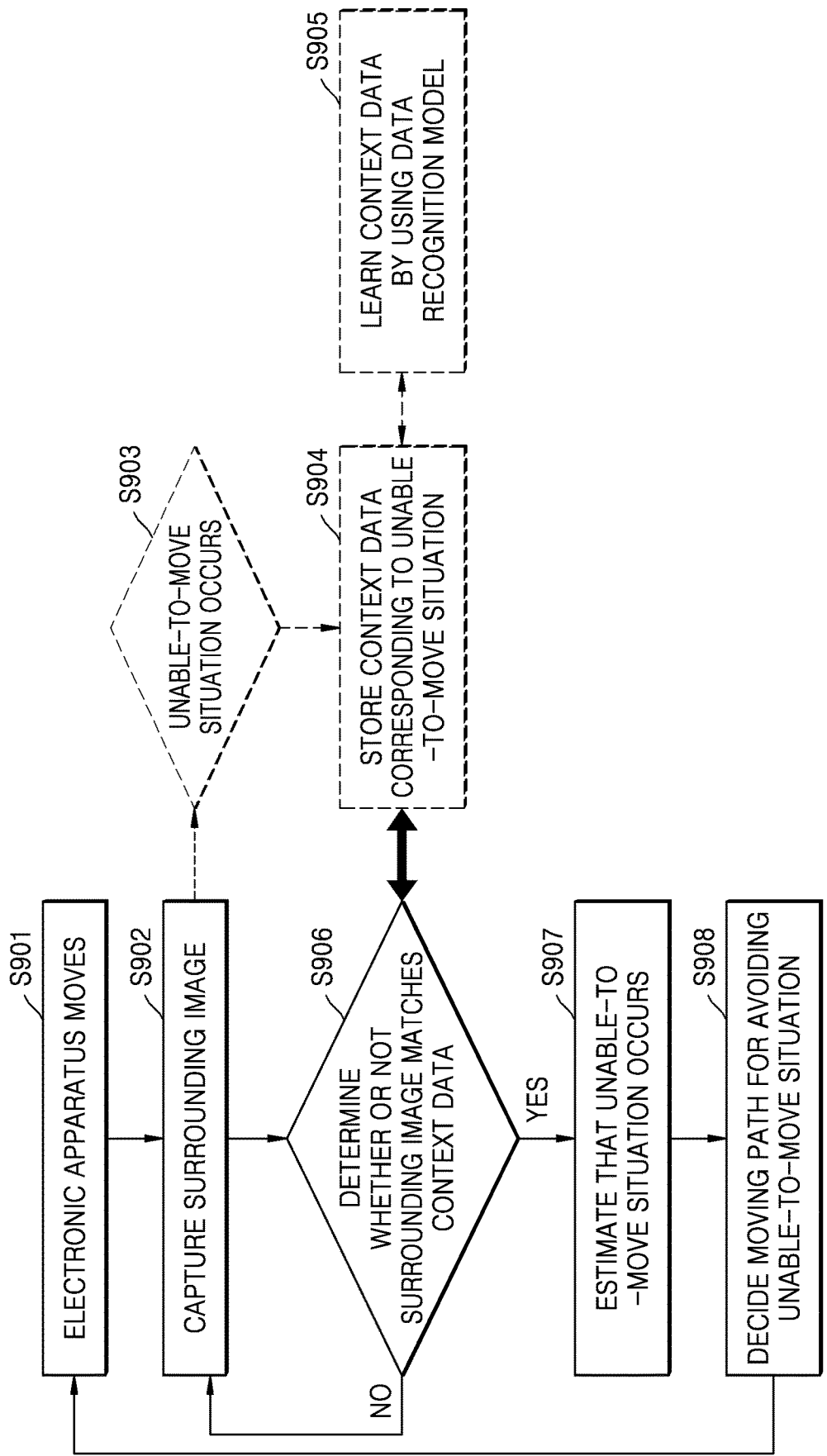
FIG. 9 is a flowchart illustrating a procedure of learning an unable-to-move situation and estimating the unable-to-move situation according to an embodiment of the disclosure.

FIG. 9 is a flowchart illustrating a procedure of learning an unable-to-move situation and estimating the unable-to-move situation, according to an embodiment of the disclosure.

Referring to FIG. 9, in operation S901 the electronic apparatus 100 according to an embodiment may move. The electronic apparatus 100 according to an embodiment may be included in the robot 1 (FIG. 1) (e.g., a robot cleaner) to operate and thus may autonomously move.

In operation S902 of FIG. 9, the electronic apparatus 100 according to an embodiment may capture a surrounding image. By using the sensor 110 including the image sensor 228, the electronic apparatus 100 may capture a surrounding image while the electronic apparatus 100 moves.

In operation S903 of FIG. 9, the electronic apparatus 100 according to an embodiment may determine an unable-to-move situation as having occurred while moving. When the electronic apparatus 100 stops moving due to an external element (e.g., being stuck on the floor or between structures, and the like) contacted while moving and is unable to restart moving via autonomous control by the robot 1, the electronic apparatus 100 according to an embodiment may determine an unable-to-move situation as having occurred.

In operation S904 of FIG. 9, the electronic apparatus 100 according to an embodiment may store context data corresponding to the unable-to-move situation in the storage unit 140 (FIG. 15). According to an embodiment of the disclosure, the electronic apparatus 100 may store context data including a surrounding image corresponding to the unable-to-move situation, an image descriptor having an image converted into vector data, location information, and the like.

In operation S905 of FIG. 9, the electronic apparatus 100 according to an embodiment may learn the context data by using a data recognition model. According to an embodiment of the disclosure, the electronic apparatus 100 may generate a virtual image, based on an image included in context data, by using a data recognition model, and may learn context data further including the virtual image. In addition, according to an embodiment of the disclosure, the electronic apparatus 100 may generate and learn context data further including feature information extracted from an image, entry point information, and the like, by using a data recognition model.

In operation S906 of FIG. 9, the electronic apparatus 100 according to an embodiment may determine whether or not the captured surrounding image matches the context data. While capturing a surrounding image at operation S902 during moving at operation S901, the electronic apparatus 100 according to an embodiment may determine whether or not the captured surrounding image matches context data stored in a storage unit at operation S904.

When determining the surrounding image captured while moving as matching the context data stored in the storage unit, the electronic apparatus 100 according to an embodiment may estimate that an unable-to-move situation corresponding to the matched context data will occur at operation S907.

In operation S908, the electronic apparatus 100 according to an embodiment may decide a moving path for avoiding the unable-to-move situation. The electronic apparatus 100 according to an embodiment may continue to move, based on the moving path decided to avoid the unable-to-move situation.

In operation S906, when the surrounding image captured while moving is determined as not matching the context data stored in the storage unit, the electronic apparatus 100 according to an embodiment may perform an operation of capturing a surrounding image while continuing to move at operation S902.

Figure 10:
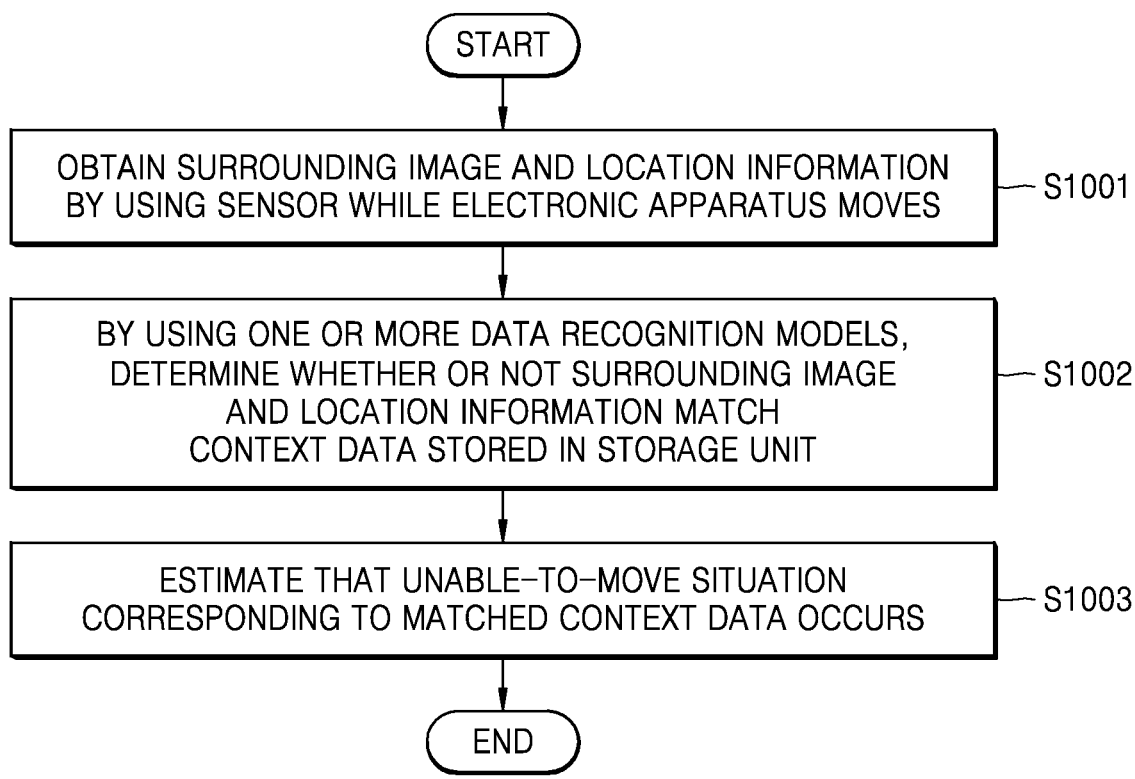
FIG. 10 is a flowchart illustrating a procedure of estimating an unable-to-move situation according to an embodiment of the disclosure.

FIG. 10 is a flowchart illustrating a procedure of estimating an unable-to-move situation according to an embodiment of the disclosure.

Figure 11:
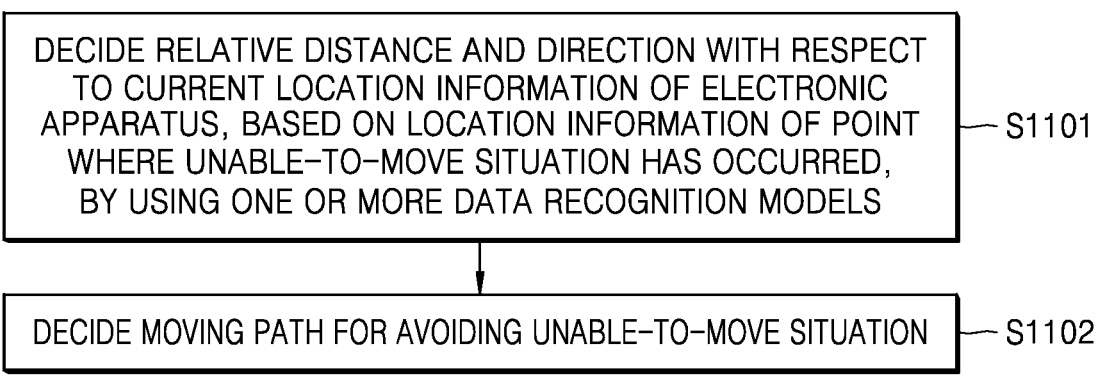
FIG. 11 is a flowchart illustrating a procedure of deciding a moving path for avoiding an unable-to-move situation according to an embodiment of the disclosure.

FIG. 11 is a flowchart illustrating a procedure of deciding a moving path for avoiding an unable-to-move situation according to an embodiment of the disclosure.

Figure 12:
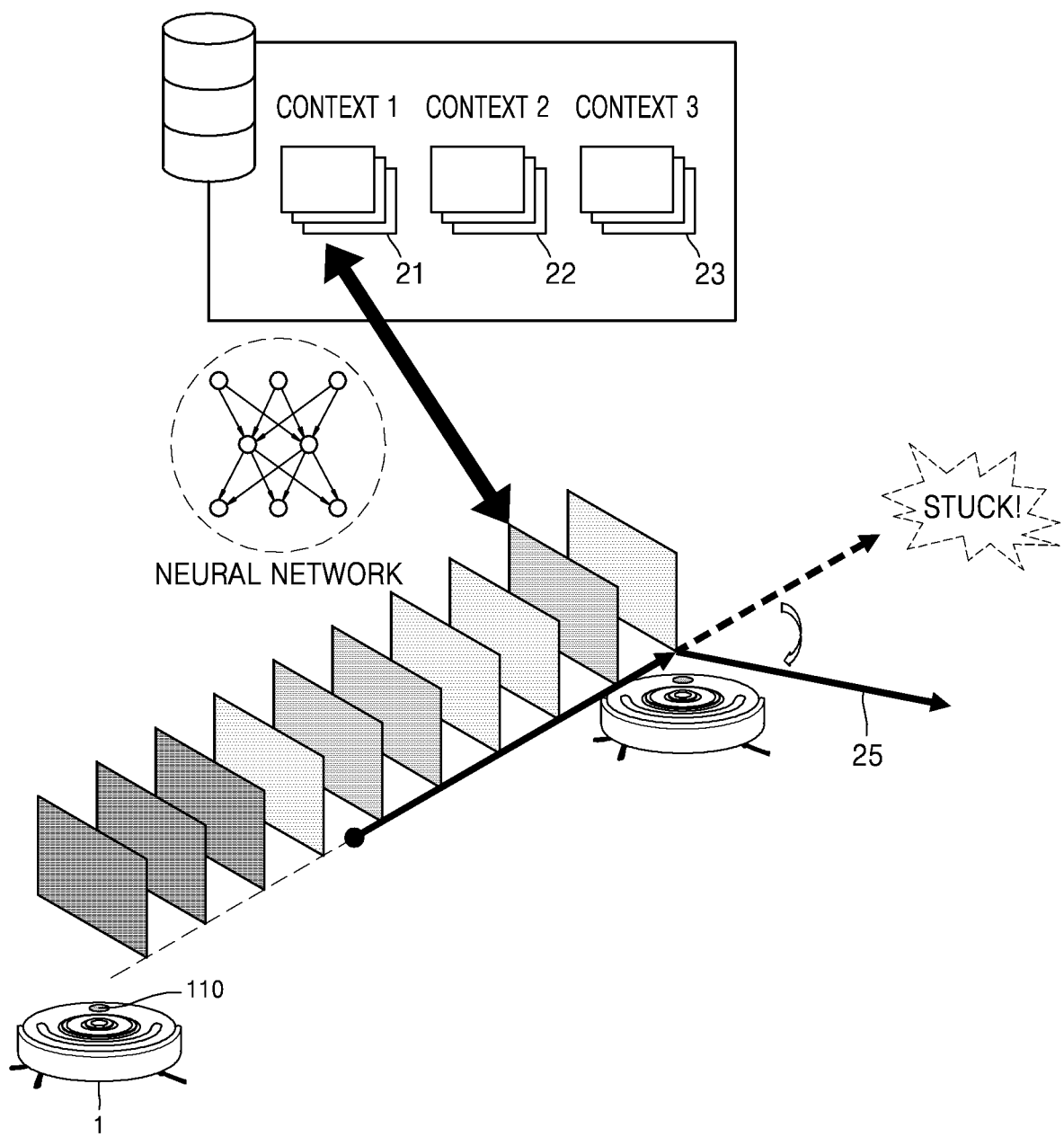
FIG. 12 is a diagram illustrating a procedure of deciding a moving path for avoiding an unable-to-move situation according to an embodiment of the disclosure.

FIG. 12 is a diagram illustrating a procedure of deciding a moving path for avoiding an unable-to-move situation according to an embodiment of the disclosure. The flowcharts of FIGS. 10 and 11 will be described with reference to the diagram of FIG. 12.

Referring to FIG. 10, in operation S1001, the electronic apparatus 100 according to an embodiment may obtain a surrounding image and location information by using the sensor 110 (FIG. 15) while moving.

Figure 16:
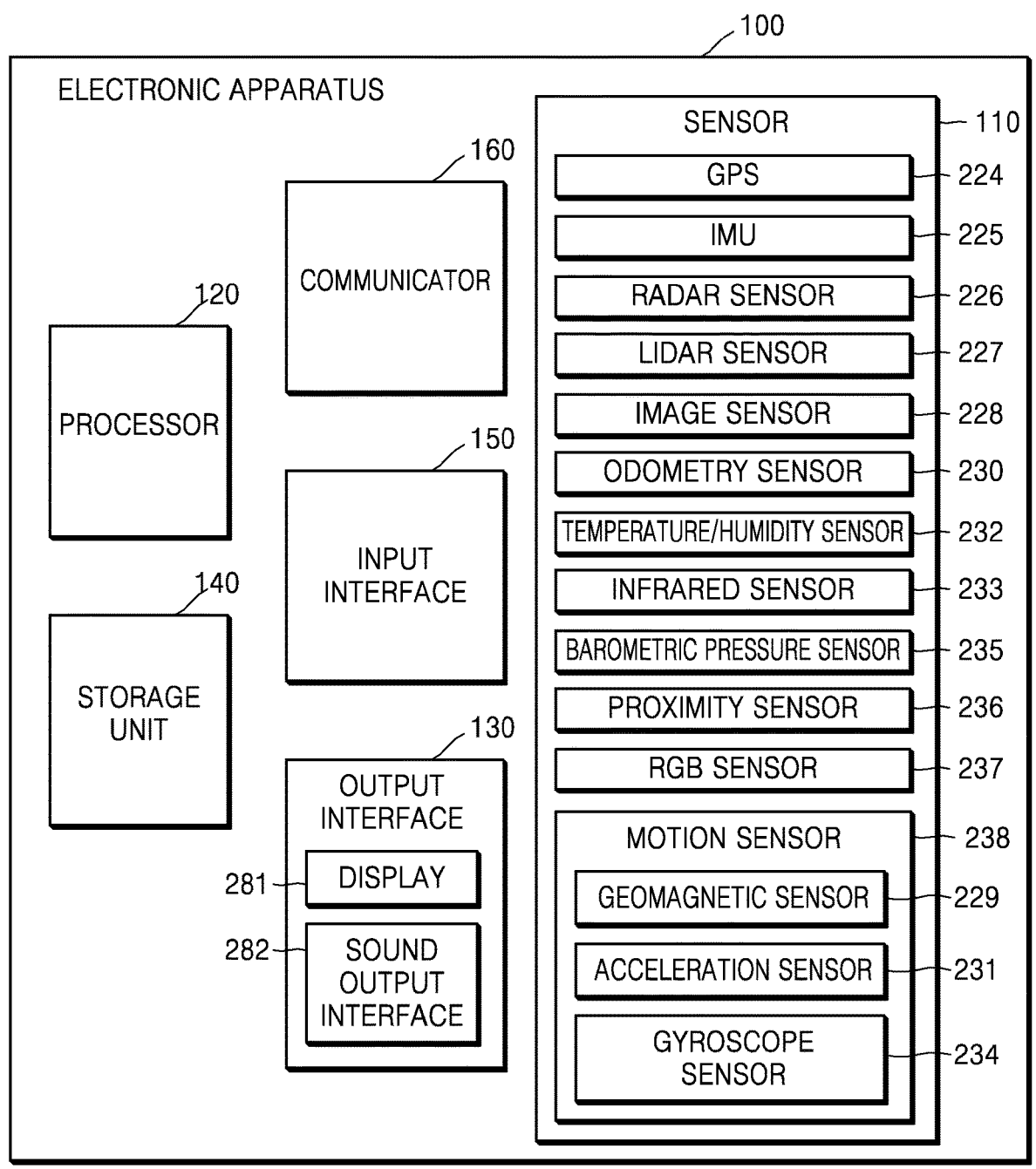
FIG. 16 is a block diagram of an electronic apparatus according to an embodiment of the disclosure.

According to an embodiment of the disclosure, the electronic apparatus 100 may obtain a surrounding image by using the sensor 110 (FIG. 16). In addition, the electronic apparatus 100 may obtain location information by using the sensor 110 (FIG. 16).

In operation S1002 of FIG. 10, the electronic apparatus 100 according to an embodiment may determine whether or not the surrounding image and the location information obtained while the electronic apparatus 100 moves matches context data stored in the storage unit 140 (FIG. 15), by using one or more data recognition models.

In operation S1003 of FIG. 10, as a result of matching the context data, the electronic apparatus 100 according to an embodiment may estimate that an unable-to-move situation corresponding to the matched context data will occur.

Referring to FIG. 11, in operation S1101 the electronic apparatus 100 according to an embodiment may decide a relative distance and direction with respect to current location information of the electronic apparatus 100, based on location information of a point where an unable-to-move situation has occurred, by using one or more data recognition models.

In operation S1102 of FIG. 11, the electronic apparatus 100 according to an embodiment may decide a moving path for avoiding the unable-to-move situation, based on the relative distance and direction decided in operation S1101.

According to an embodiment of the disclosure, the electronic apparatus 100 may analyze a relative distance and direction with respect to a point where an unable-to-move situation has occurred, from a current location, by using a data recognition model, and may analyze in which direction the electronic apparatus 100 should move to avoid the unable-to-move situation. Referring to FIG. 12, the electronic apparatus 100 may determine whether or not a surrounding image captured while moving matches context data 21, 22, and 23 stored in the storage unit 140 (FIG. 15). As the surrounding image obtained while moving is determined as matching the context data 21, the electronic apparatus 100 may estimate that an unable-to-move situation corresponding to the context data 21 will occur, and may change (25) a moving path to avoid the unable-to-move situation.

According to an embodiment of the disclosure, by storing and learning context data regarding a situation in which an unable-to-move situation occurs as the robot 1 contacts a certain structure, the unable-to-move situation may be estimated and be controlled to be avoid from in advance when the robot 1 approaches the same structure again later.

Figure 13:
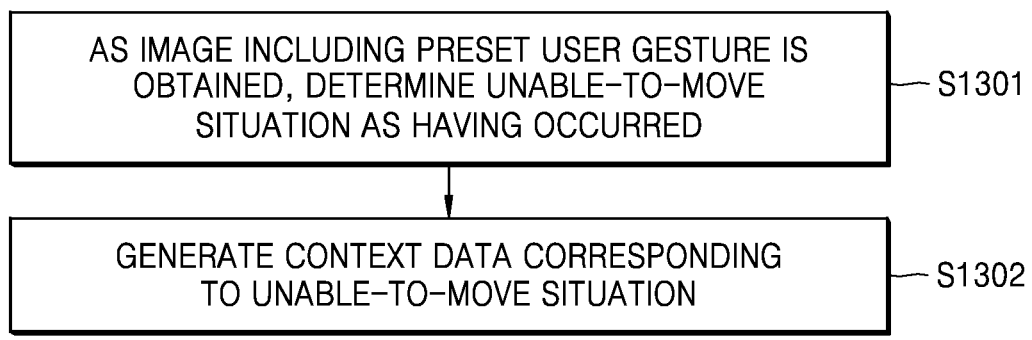
FIG. 13 is a flowchart illustrating a procedure of determining an unable-to-move situation according to an embodiment of the disclosure.
Figure 14:
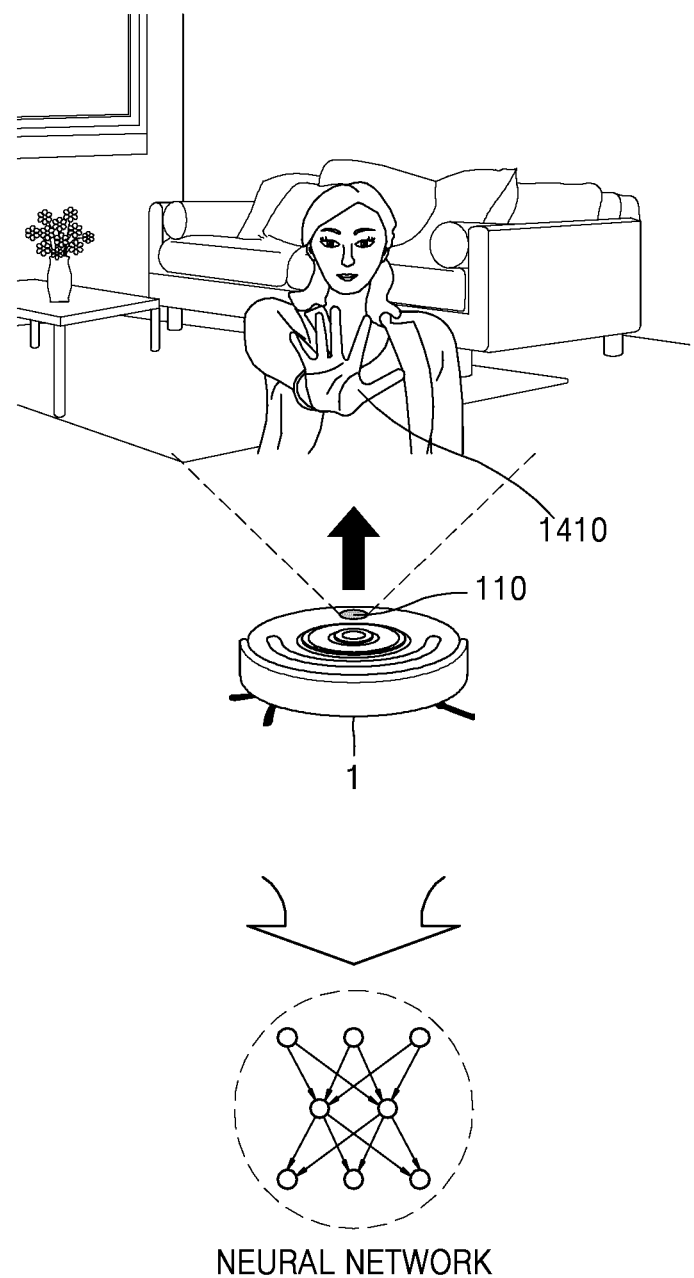
FIG. 14 is a diagram illustrating a procedure of determining an unable-to-move situation according to another embodiment of the disclosure.

FIG. 13 is a flowchart illustrating a procedure of determining an unable-to-move situation according to an embodiment of the disclosure. FIG. 14 is a diagram illustrating a procedure of determining an unable-to-move situation according to an embodiment of the disclosure. The flowchart of FIG. 13 will be described with reference to the diagram of FIG. 14.

Referring to FIG. 13. as described above with reference to FIG. 1, when the electronic apparatus 100 stops moving due to an external element (e.g., being stuck on the floor or between structures, and the like) contacted while moving and is unable to restart moving via autonomous control by the robot 1, the electronic apparatus 100 according to an embodiment may determine an unable-to-move situation as having occurred.

As another example, as the electronic apparatus 100 according to an embodiment determines a preset user gesture as being included in an image obtained while moving, the electronic apparatus 100 may determine an unable-to-move situation as having occurred at operation S1301, FIG. 13). Referring to FIG. 14, the electronic apparatus 100 may capture a surrounding image by using the sensor 110 while moving. As the electronic apparatus 100 obtains a surrounding image including a preset user gesture 1410 (e.g., a user's gesture of opening and raising his or her palm toward the electronic apparatus 100), the electronic apparatus 100 may determine an unable-to-move situation as having occurred.

For example, the user may need to set the robot cleaner 1 not to enter a certain space (e.g., a nursery). In this regard, when the user makes a gesture preset on the electronic apparatus 100 (e.g., a gesture of opening and raising his or her palm) toward the electronic apparatus 100, the electronic apparatus 100 may process a space that the user gesture is input in the same way as the unable-to-move situation.

In operation S1302 of FIG. 13, the electronic apparatus 100 according to an embodiment may generate context data corresponding to the unable-to-move situation.

According to an embodiment of the disclosure, the electronic apparatus 100 may perform an operation according to occurrence of the unable-to-move situation. The electronic apparatus 100 may generate context data, based on a time of obtaining an image including a preset user gesture. The electronic apparatus 100 may learn the context data by using a data recognition model.

FIG. 15 is a block diagram of an electronic apparatus according to an embodiment of the disclosure.

Referring to FIG. 15, the electronic apparatus 100 may include the sensor 110, the storage unit 140, and the processor 120. In FIG. 15, only elements of the electronic apparatus 100 related to the embodiment are illustrated. Accordingly, it will be understood by those of ordinary skill in the art that other general-use elements may be further included in addition to the elements illustrated in FIG. 15.

According to an embodiment of the disclosure, the sensor 110 may capture a surrounding image of the robot 1 while the robot 1 moves. In addition, the sensor 110 may obtain location information of the robot 1 while the robot 1 moves.

The sensor 110 may include a plurality of sensors for obtaining the surrounding image of the robot 1. For example, the sensor 110 may include the image sensor 228, such as a camera.

In addition, the sensor 110 may include a plurality of sensors for obtaining the location information of the robot 1. For example, the sensor 110 may include distance sensors, such as a RADAR sensor 226, a LIDAR sensor 227, and an odometry sensor 230.

In addition, the sensor 110 may include one or more actuators configured to change locations and/or orientation of a plurality of sensors and thus may capture an image in each of front, rear, and side directions.

The storage unit 140 may include a magnetic disk drive, an optical disk drive, and a flash memory. Alternatively, the storage unit 140 may be a portable universal serial bus (USB) data storage device. The storage unit 140 may store system software for executing examples related to the application.

The system software for executing examples related to the application may be stored in a portable storage medium.

According to an embodiment of the disclosure, the storage unit 140 may store context data corresponding to an unable-to-move situation.

In addition, according to an embodiment of the disclosure, the storage unit 140 may store a surrounding image captured while the electronic apparatus 100 moves.

According to an embodiment of the disclosure, the processor 120 may include at least one processor.

According to an embodiment of the disclosure, the processor 120 may capture a surrounding image by using the sensor 110 while the electronic apparatus 100 moves.

In addition, as an unable-to-move situation occurs while the electronic apparatus 100 moves, the processor 120 may generate context data including the surrounding image captured within a predetermined time from a time when the unable-to-move situation has occurred.

In addition, the processor 120 may store context data corresponding to the unable-to-move situation in the storage unit 140.

In addition, the processor 120 may learn the context data stored in the storage unit 140 by using one or more data recognition models.

In addition, the processor 120 may generate a virtual image estimated to be obtained when a point where the unable-to-move situation corresponding to the context data has occurred is approached from a different direction, based on the context data including the surrounding image, by using one or more data recognition models.

In addition, the processor 120 may store context data further including the generated virtual image in the storage unit 140.

In addition, by using the sensor 110, the processor 120 may obtain location information indicating a location of the electronic apparatus 100 while the electronic apparatus 100 moves.

In addition, as an unable-to-move situation occurs while the electronic apparatus 100 moves, the processor 120 may store context data further including the location information corresponding to a point where the unable-to-move situation has occurred in the storage unit 140.

In addition, by using one or more data recognition models, the processor 120 may extract feature information from the surrounding image included in the context data, and may store context data further including the extracted feature information in the storage unit 140.

In addition, the processor 120 may decide entry point information including an image frame and location information corresponding to an entry point leading to a point where the unable-to-move situation has occurred, based on the context data including the surrounding image, by using one or more data recognition models.

In addition, the processor 120 may store context data further including the entry point information in the storage unit 140.

In addition, by using one or more data recognition models, the processor 120 may determine whether or not the surrounding image captured while the electronic apparatus 100 moves matches the context data stored in the storage unit 140.

In addition, as the captured surrounding image matches the context data, the processor 120 may estimate that an unable-to-move situation corresponding to the matched context data will occur.

As the unable-to-move situation is estimated to occur, the processor 120 may decide a relative distance and direction with respect to current location information of the electronic apparatus 100, based on location information of a point where the unable-to-move situation has occurred, which is included in the matched context data, by using one or more data recognition models. In addition, the processor 120 may decide a moving path for avoiding the unable-to-move situation, based on the relative distance and direction.

In addition, as an image including a preset user gesture is obtained, the processor 120 may determine the unable-to-move situation as having occurred.

FIG. 16 is a block diagram of an electronic apparatus according to an embodiment of the disclosure.

Referring FIG. 16, the electronic apparatus 100 may further include an output interface 130, an input interface 150, and a communicator 160 in addition to the sensor 110, the processor 120, and the storage unit 140 described above with reference to FIG. 15.

The sensor 110 may include a plurality of sensors configured to sense information regarding surroundings where the robot 1 is located, and may include one or more actuators configured to change locations and/or orientation of the sensors. For example, the sensor 110 may include a global positioning system (GPS) 224, an inertial measurement unit (IMU) 225, the RADAR sensor 226, the LIDAR sensor 227, the image sensor 228, and the odometry sensor 230. In addition, the sensor 110 may include at least one of a temperature/humidity sensor 232, an infrared sensor 233, a barometric pressure sensor 235, a proximity sensor 236, and a red, green, blue (RGB) sensor (illuminance sensor) 237, but the disclosure is not limited thereto. Functions of each sensor may be intuitively inferred from the name thereof by those of ordinary skill in the art, and thus, a detailed description thereof is omitted below.

In addition, the sensor 110 may include a motion sensor 238 capable of sensing motion of the robot 1. The motion sensor 238 may include a magnetic sensor 229, an acceleration sensor 231, and a gyroscope sensor 234.

The GPS 224 may be a sensor configured to estimate a geographical location of the robot 1. For example, the GPS 224 may include a transceiver configured to estimate a location of the robot 1 with respect to the earth.

The IMU 225 may be a combination of sensors configured to sense changes in a location and orientation of the robot 1, based on inertial acceleration. For example, the combination of sensors may include accelerometers and gyroscopes.

The RADAR sensor 226 may be a sensor configured to sense objects within an environment where the robot 1 is located by using radio signals. In addition, the RADAR sensor 226 may be configured to sense speed and/or direction of the objects.

The LIDAR sensor 227 may be a sensor configured to sense objects within an environment where the robot 1 is located by using laser. Moreover, the LIDAR sensor 227 may include a laser light source configured to emit laser and/or a laser scanner, and a detector configured to detect reflection of laser. The LIDAR sensor 227 may be configured to operate in a coherent (e.g., using heterodyne detection) or an incoherent detection mode.

The image sensor 228 may be a still camera or video camera configured to record an environment outside of the robot 1. For example, the image sensor 228 may include a plurality of cameras, and the plurality of cameras may be arranged in a plurality of locations on the outside the robot 1. The odometry sensor 230 may estimate a location of the robot 1 and may measure a moving distance. For example, the odometery sensor 230 may measure a location change value of the robot 1 by using the number of revolutions of wheels of the robot 1.

The communicator 160 may include at least one antenna for communicating with another device wirelessly. For example, the communicator 160 may be used to wirelessly communicate with a cellular network or another wireless protocol and system via Wi-Fi or Bluetooth (BT). The communicator 160 controlled by the processor 120 may transmit and receive radio signals. For example, the processor 120 may execute a program included in the storage unit 140 to allow the communicator 160 to transmit and receive radio signals with a cellular network.

The input interface 150 refers to a means of inputting data for controlling the robot 1. Examples of the input interface 150 may include a key pad, a dome switch, a touch pad (a touch-type capacitive touch pad, a pressure-type resistive overlay touch pad, an infrared ray sensing touch pad, a surface acoustic wave conduction touch pad, an integration-type tension measurement touch pad, a piezo effect-type touch pad, and the like), a jog wheel, and a jog switch, but the disclosure is not limited thereto. In addition, the input interface 150 may include a microphone configured to receive audio (e.g., a voice command) from a user.

The output interface 130 may output an audio signal or a video signal, and an output interface 130 may include a display 281 and a sound output interface 282.

The display 281 may include at least one of a liquid crystal display, a thin film transistor-liquid crystal display, an organic light-emitting diode, a flexible display, a three-dimensional (3D) display, and an electrophoretic display. The output interface 130 may include two or more displays 281 according to a form in which the output interface 130 is implemented.

The sound output interface 282 outputs audio data received from the communicator 160 or stored in the storage unit 140. In addition, the sound output interface 282 may include a speaker, a buzzer, and the like.

The input interface 150 and the output interface 130 may include a network interface and may be implemented as a touchscreen.

The processor 120 may generally control the sensor 110, the communicator 160, the input interface 150, the storage unit 140, and the output interface 130 by executing programs stored in the storage unit 140.

Figure 17:
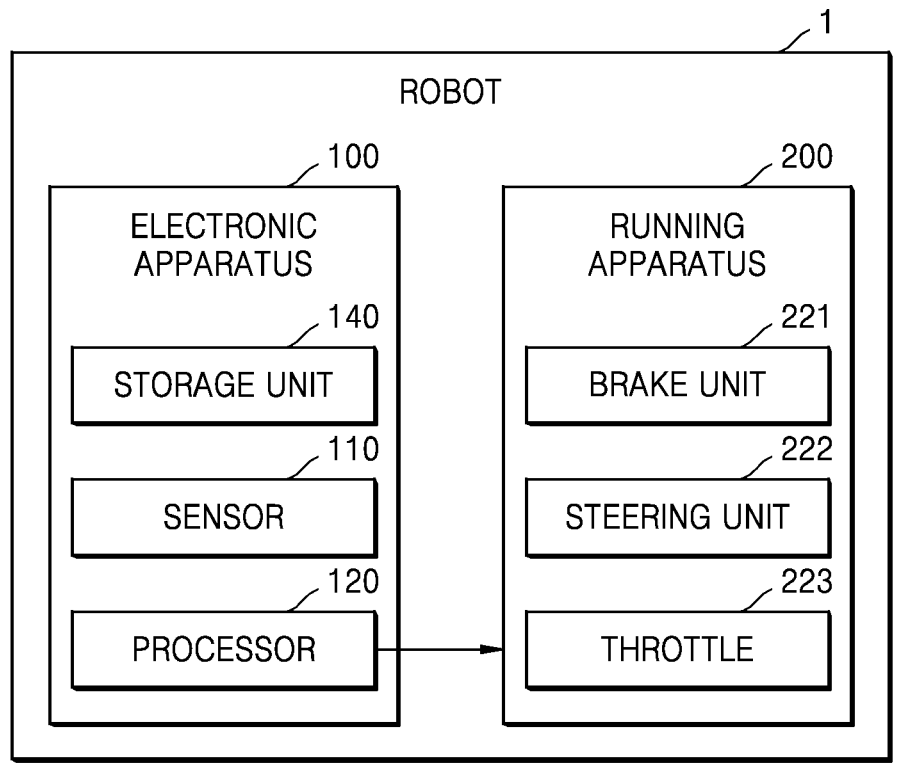
FIG. 17 is a block diagram of a robot according to an embodiment of the disclosure.

FIG. 17 is a block diagram of a robot according to an embodiment of the disclosure.

Referring to FIG. 17, the robot 1 may include the electronic apparatus 100 and a running apparatus 200. In FIG. 17, only elements of the robot 1 related to the embodiment are illustrated. Accordingly, it will be understood by those of ordinary skill in the art that other general-use elements may be further included in addition to the elements illustrated in FIG. 17.

The electronic apparatus 100 may include the sensor 110, the storage unit 140, and the processor 120.

The sensor 110, the storage unit 140, and the processor 120 have been described above with reference to FIGS. 15 and 16, and thus, a description thereof is omitted below.

The running apparatus 200 may include a brake unit 221, a steering unit 222, and a throttle 223.

The steering unit 222 may be a combination of mechanisms configured to adjust a direction of the robot 1.

The throttle 223 may be a combination of mechanisms configured to control a speed of the robot 1 by controlling an operation speed of engine/motor.

The brake unit 221 may be a combination of mechanisms configured to decelerate the robot 1. For example, the brake unit 221 may use friction to decrease a speed of wheels of the robot 1.

Figure 18:
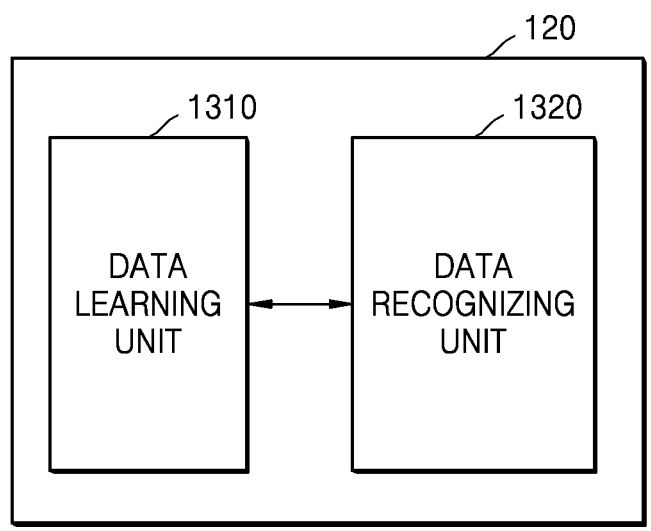
FIG. 18 is a block diagram of a processor according to an embodiment of the disclosure.

FIG. 18 is a block diagram of a processor according to an embodiment of the disclosure.

Referring to FIG. 18, the processor 120 may include a data learning unit 1310 and a data recognizing unit 1320.

The data learning unit 1310 may learn a criterion for situation determination. The data learning unit 1310 may learn a criterion regarding which data will be used to determine a certain situation and how a situation will be determined by using data. The data learning unit 1310 may obtain data for use in learning, and may learn a criterion for situation determination by applying the obtained data to a data recognition model described below.

The data recognizing unit 1320 may determine a situation based on data. The data recognizing unit 1320 may recognize a situation from certain data by using a trained data recognition model. The data recognizing unit 1320 may obtain certain data according to a criterion preset by learning, and may determine a certain situation based on the certain data by using a data recognition model with the obtained data as an input value. In addition, a result value output by the data recognition model with the obtained data as an input value may be used to modify and refine the data recognition model.

At least one of the data learning unit 1310 and the data recognizing unit 1320 may be manufactured in the form of at least one hardware chip and be equipped in an electronic apparatus. For example, at least one of the data learning unit 1310 and the data recognizing unit 1320 may be manufactured in the form of an exclusive hardware chip for artificial intelligence (AI), or may be manufactured as a part of an existing general-use processor (e.g., a central processing unit (CPU) or an application processor) or a graphic exclusive processor (for example, a graphics processing unit (GPU)) and be equipped in various types of electronic apparatuses described above.

In this case, the data learning unit 1310 and the data recognizing unit 1320 may be equipped in one electronic apparatus or may be respectively equipped in separate electronic apparatuses. For example, one of the data learning unit 1310 and the data recognizing unit 1320 may be included in an electronic apparatus, and the other may be included in a server. In addition, the data learning unit 1310 and the data recognizing unit 1320 may provide model information built by the data learning unit 1310 to the data recognizing unit 1320 in a wired or wireless fashion, and in some embodiments of the disclosure, data input to the data recognizing unit 1320 may be provided to the data learning unit 1310 as additional learning data.

At least one of the data learning unit 1310 and the data recognizing unit 1320 may be implemented as a software module. When at least one of the data learning unit 1310 and the data recognizing unit 1320 is implemented as a software module (or a program module including an instruction), the software module may be stored in non-transitory computer-readable recording media. In this case, at least one software module may be provided by an operating system (OS), or may be provided by a certain application.

Alternatively, one portion of at least one software module may be provided by an OS, and the other portion may be provided by a certain application.

Figure 19:
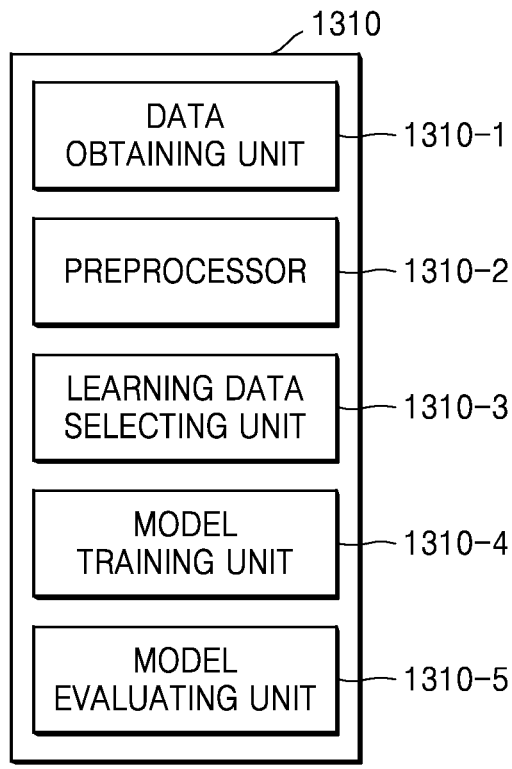
FIG. 19 is a block diagram of a data learning unit according to an embodiment of the disclosure.

FIG. 19 is a block diagram of a data learning unit according to an embodiment of the disclosure.

Referring to FIG. 19, a data learning unit 1310 may include a data obtaining unit 1310-1, a preprocessor 1310-2, a learning data selecting unit 1310-3, a model training unit 1310-4, and a model evaluating unit 1310-5. The data obtaining unit 1310-1 may obtain data required for situation determination. The data obtaining unit 1310-1 may obtain data required for learning for situation determination.

According to an embodiment of the disclosure, when an unable-to-move situation occurs, the data obtaining unit 1310-1 may obtain context data regarding the unable-to-move situation. For example, the data obtaining unit 1310-1 may receive a surrounding image of the robot 1 corresponding to a time when the unable-to-move situation has occurred. As an example, the data obtaining unit 1310-1 may receive data via an input device (e.g., a microphone, a camera, or a sensor) of an electronic apparatus. Alternatively, the data obtaining unit 1310-1 may obtain data via an external apparatus communicating with an electronic apparatus.

According to an embodiment of the disclosure, the surrounding image may include a plurality of images (or frames). As an example, the data obtaining unit 1310-1 may receive a video via a camera of an electronic apparatus including the data learning unit 1310, or an external camera (e.g., closed-circuit television (CCTV) or a black box) capable of communicating with the electronic apparatus including the data learning unit 1310.

In this regard, the camera may include one or more image sensors (e.g., a front sensor or a rear sensor), a lens, an image signal processor (ISP), or a flash (e.g., a light-emitting diode (LED) or a xenon lamp).

The preprocessor 1310-2 may preprocess obtained data to allow the obtained data to be used in learning for situation determination. The preprocessor 1310-2 may process the obtained data into a preset format to allow the model training unit 1310-4 described below to use the obtained data in learning for situation determination. For example, based on a common area included in each of a plurality of images (or frames) constituting at least one portion of input video, the preprocessor 1310-2 may generate one composite image by at least partially overlapping the plurality of images. In this case, a plurality of composite images may be generated from one video. The common area may be an area including an identical or similar common object (e.g., an object, animals and plants, or, a person) in each of the plurality of images. Alternatively, the common area may be an area having an identical or similar color, shade, RGB value, CMYK value, or the like in each of the plurality of images.

The learning data selecting unit 1310-3 may select data required for learning from among preprocessed data. The selected data may be provided to the model training unit 1310-4. The learning data selecting unit 1310-3 may select data required for learning from among preprocessed data, according to a preset criterion for situation determination. In addition, the learning data selecting unit 1310-3 may select data according to a criterion preset by learning due to the model training unit 1310-4 described below.

For example, data regarding furniture, a structure, and the like, that may affect a moving path where an unable-to-move situation of the robot 1 has occurred may be selected.

The model training unit 1310-4 may learn a criterion regarding how to determine a situation based on learning data. In addition, the model training unit 1310-4 may learn a criterion regarding which learning data to use for situation determination.

According to an embodiment of the disclosure, the model training unit 1310-4 may learn a criterion regarding which unable-to-move situation to estimate, based on context data regarding the unable-to-move situation having occurred.

In addition, the model training unit 1310-4 may train a data recognition model for use in situation determination by using learning data. In this case, the data recognition model may be a previously built model. For example, the data recognition model may be a model previously built by receiving basic learning data (e.g., a sample image).

The data recognition model may be built by taking into account a factor, such as an application field of the data recognition model, a purpose of learning, or computer performance of an apparatus. The data recognition model may be, for example, a model based on a neural network. For example, a model such as a deep neural network (DNN), a recurrent neural network (RNN), or a bidirectional recurrent deep neural network (BRDNN) may be used as the data recognition model, but the disclosure is not limited thereto. According to various embodiments of the disclosure, when there are a plurality of previously built data recognition models, the model training unit 1310-4 may determine a data recognition model in which input learning data and basic learning data have a high relevance as a data recognition model that will be trained. In this case, the basic learning data may be previously classified according to types of data, and the data recognition model may be previously built according to types of data. For example, the basic training data may be previously classified according to various criteria, such as an area where learning data is generated, a time when learning data is generated, a size of learning data, a genre of learning data, a generator of learning data, a type of an object within learning data, and the like.

In addition, the model training unit 1310-4 may train a data recognition model by using a learning algorithm including, for example, an error back-propagation method or a gradient descent method.

In addition, the model training unit 1310-4 may train a data recognition model, for example, via supervised learning with learning data as an input value. In addition, the model training unit 1310-4 may train a data recognition model, for example, via unsupervised learning in which a criterion for situation determination is discovered by learning by itself a type of data required to determine a situation without supervision. In addition, the model training unit 1310-4 may train a data recognition model, for example, via reinforcement learning using a feedback regarding whether or not a result of determining a situation according to learning is correct.

In addition, when a data recognition model is trained, the model training unit 1310-4 may store the trained data recognition model. In this case, the model training unit 1310-4 may store the trained data recognition model in a memory of an electronic apparatus including the data recognizing unit 1320. Alternatively, the model training unit 1310-4 may store the trained data recognition model in a memory of an electronic apparatus including the data recognizing unit 1320 described below. Alternatively, the model training unit 1310-4 may store the trained data recognition model in a memory of a server connected to an electronic apparatus via a wired or wireless network.
In this case, the memory storing the trained data recognition model may also store, for example, a command or data related to at least one other component of an electronic apparatus. In addition, the memory may store software and/or a program. The program may include, for example, a kernel, middleware, an application programming interface (API) and/or an application program (or "application").

The model evaluating unit 1310-5 may input evaluation data to a data recognition model, and when a recognition result output from the evaluation data fails to satisfy a certain criterion, the model evaluating unit 1310-5 may allow the model training unit 1310-4 to perform training again. In this case, the evaluation data may be preset data for evaluating the data recognition model.

For example, when the number or percentage of pieces of evaluation data of which a recognition result is not accurate among classification results of the trained data recognition model for evaluation data exceeds a preset threshold, the model evaluating unit 1310-5 may evaluate a certain criterion as being unsatisfied. For example, in a case where the certain criterion is defined as 2%, when the trained data recognition model outputs wrong recognition results for more than 20 pieces of evaluation data among a total of 1000 pieces of evaluation data, the model evaluating unit 1310-5 may evaluate the trained data recognition model as being unsuitable.

When there are a plurality of trained data recognition models, the model evaluating unit 1310-5 may evaluate whether each of the trained data recognition models satisfies a certain criterion, and may decide a model satisfying the certain criterion as a final data recognition model. In this case, when a plurality of models satisfy the certain criterion, the model evaluating unit 1310-5 may decide any one preset model or a certain number of models in an order of higher evaluation score as the final data recognition model.

At least one of the data obtaining unit 1310-1, the preprocessor 1310-2, the learning data selecting unit 1310-3, the model training unit 1310-4, and the model evaluating unit 1310-5 in the data learning unit 1310 may be manufactured in the form of at least one hardware chip and be equipped in an electronic apparatus. For example, at least one of the data obtaining unit 1310-1, the preprocessor 1310-2, the learning data selecting unit 1310-3, the model training unit 1310-4, and the model evaluating unit 1310-5 may be manufactured in the form of an exclusive hardware chip for AI, or may be manufactured as a part of an existing general-use processor (e.g., a CPU or an application processor) or a graphic exclusive processor (e.g., a GPU) and be equipped in various types of electronic apparatuses described above.

In addition, the data obtaining unit 1310-1, the preprocessor 1310-2, the learning data selecting unit 1310-3, the model training unit 1310-4, and the model evaluating unit 1310-5 may be equipped in one electronic apparatus, or may be respectively equipped in separate electronic apparatuses. For example, some of the data obtaining unit 1310-1, the preprocessor 1310-2, the learning data selecting unit 1310-3, the model training unit 1310-4, and the model evaluating unit 1310-5 may be included in an electronic apparatus, and the others may be included in a server.

In addition, at least one of the data obtaining unit 1310-1, the preprocessor 1310-2, the learning data selecting unit 1310-3, the model training unit 1310-4, and the model evaluating unit 1310-5 may be implemented as a software module. When at least one of the data obtaining unit 1310-1, the preprocessor 1310-2, the learning data selecting unit 1310-3, the model training unit 1310-4, and the model evaluating unit 1310-5 is implemented as a software module (or a program module including an instruction), the software module may be stored in non-transitory computer-readable recording media. In addition, in this case, at least one software module may be provided by an OS or may be provided by a certain application. Alternatively, one portion of at least one software module may be provided by an OS, and the other portion may be provided by a certain application.

Figure 20:
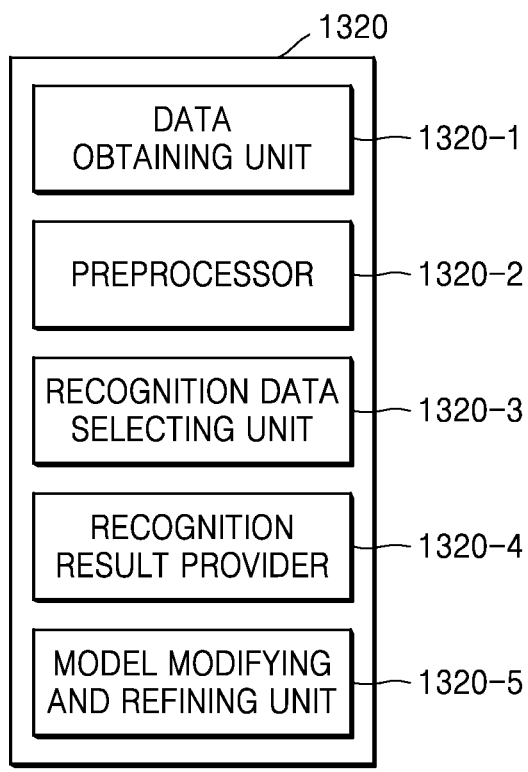
FIG. 20 is a block diagram of a data recognizing unit according to an embodiment of the disclosure.

FIG. 20 is a block diagram of a data recognizing unit according to an embodiment of the disclosure.

Referring to FIG. 20, the data recognizing unit 1320 may include a data obtaining unit 1320-1, a preprocessor 1320-2, a recognition data selecting unit 1320-3, a recognition result provider 1320-4, and a model modifying and refining unit 1320-5.

The data obtaining unit 1320-1 may obtain data required for situation determination, and the preprocessor 1320-2 may preprocess the obtained data to use the obtained data for situation determination. The preprocessor 1320-2 may process the obtained data into a preset format to allow the recognition result provider 1320-4 described below to use the obtained data for situation determination.

The recognition data selecting unit 1320-3 may select data required for situation determination from among preprocessed data. The selected data may be provided to the recognition result provider 1320-4. The recognition data selecting unit 1320-3 may select a portion or all of the preprocessed data according to a preset criterion for situation determination. In addition, the recognition data selecting unit 1320-3 may select data according to a criterion preset by learning due to the model training unit 1310-4 described below.

The recognition result provider 1320-4 may determine a situation by applying selected data to a data recognition model. The recognition result provider 1320-4 may provide a recognition result according to a purpose of data recognition. The recognition result provider 1320-4 may use data selected by the recognition data selecting unit 1320-3 as an input value and thus may apply the selected data to the data recognition model. In addition, the recognition result may be decided by the data recognition model.

According to an embodiment of the disclosure, an estimated unable-to-move situation of the robot 1 may be provided using text, voice, a video, an image, an instruction (e.g., an application executing instruction, a module function executing instruction, and the like), or the like.

The model modifying and refining unit 1320-5 may modify and refine a data recognition model, based on evaluation regarding a recognition result provided by the recognition result provider 1320-4. For example, the model modifying and refining unit 1320-5 may allow the model training unit 1310-4 to modify and refine the data recognition model by providing the recognition result provided by the recognition result provider 1320-4 to the model training unit 1310-4.

At least one of the data obtaining unit 1320-1, the preprocessor 1320-2, the recognition data selecting unit 1320-3, the recognition result provider 1320-4, and the model modifying and refining unit 1320-5 in the data recognizing unit 1320 may be manufactured in the form of at least one hardware chip and be equipped in an electronic apparatus. For example, at least one of the data obtaining unit 1320-1, the preprocessor 1320-2, the recognition data selecting unit 1320-3, the recognition result provider 1320-4, and the model modifying and refining unit 1320-5 may be manufactured in the form of an exclusive hardware chip for AI, or may be manufactured as a part of an existing general-use processor (e.g., a CPU or an application processor) or a graphic exclusive processor (e.g., a GPU) and be equipped in various types of electronic apparatuses described above.

In addition, the data obtaining unit 1320-1, the preprocessor 1320-2, the recognition data selecting unit 1320-3, the recognition result provider 1320-4, and the model modifying and refining unit 1320-5 may be equipped in one electronic apparatus, or may be respectively equipped in separate electronic apparatuses. For example, some of the data obtaining unit 1320-1, the preprocessor 1320-2, the recognition data selecting unit 1320-3, the recognition result provider 1320-4, and the model modifying and refining unit 1320-5 may be included in an electronic apparatus, and the others may be included in a server.

In addition, at least one of the data obtaining unit 1320-1, the preprocessor 1320-2, the recognition data selecting unit 1320-3, the recognition result provider 1320-4, and the model modifying and refining unit 1320-5 may be implemented as a software module. When at least one of the data obtaining unit 1320-1, the preprocessor 1320-2, the recognition data selecting unit 1320-3, the recognition result provider 1320-4, and the model modifying and refining unit 1320-5 is implemented as a software module (or a program module including an instruction), the software module may be stored in non-transitory computer-readable recording media. In addition, in this case, at least one software module may be provided by an OS, or may be provided by a certain application. Alternatively, one portion of at least one software module may be provided by an OS, and the other portion may be provided by a certain application.

Figure 21:
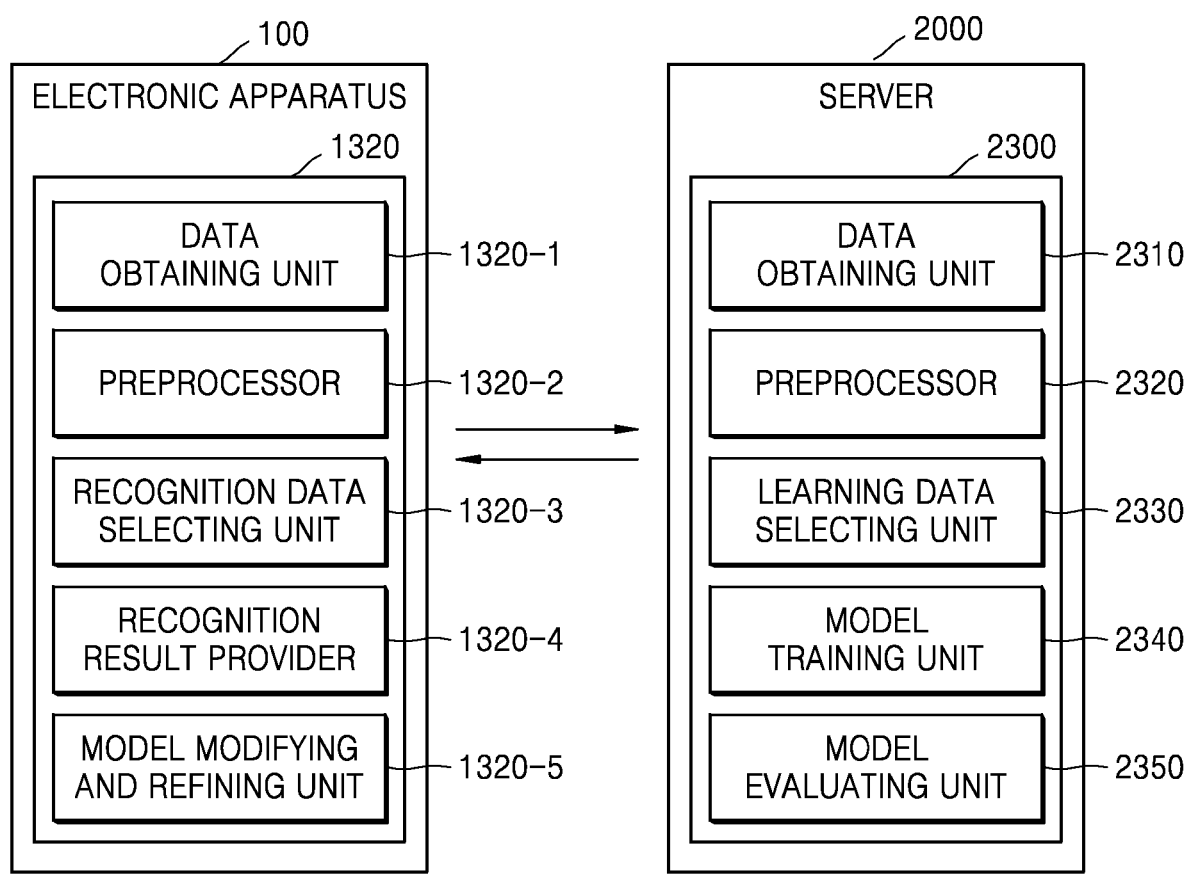
FIG. 21 is a diagram illustrating data being learned and recognized as an electronic apparatus and a server interwork with each other according to an embodiment of the disclosure.

FIG. 21 is a diagram illustrating data being learned and recognized as an electronic apparatus and a server interwork with each other according to an embodiment of the disclosure.

Referring to FIG. 21, the server 2000 may learn a criterion for situation determination, and the electronic apparatus 100 may determine a situation based on a learning result by the server 2000. The server 2000 may include a data obtaining unit 2310, a preprocessor 2320, a learning data selecting unit 2330, a model training unit 2340, and a model evaluating unit 2350.

In this case, the model training unit 2340 of the server 2000 may perform functions of the model training unit 1310-4 illustrated in FIG. 19. The model training unit 2340 of the server 2000 may learn a criterion regarding which data will be used to determine a certain situation and how a situation will be determined by using data. The model training unit 2340 may obtain data that will be used in learning, and may learn a criterion for situation determination by applying the obtained data to a data recognition model described below.

In addition, the recognition result provider 1320-4 of the electronic apparatus 100 may determine a situation by applying data selected by the recognition data selecting unit 1320-3 to a data recognition model generated by the server 2000. For example, the recognition result provider 1320-4 may transmit data selected by the recognition data selecting unit 1320-3 to the server 2000, and may request the server 2000 to determine a situation by applying the data selected by the recognition data selecting unit 1320-3 to a determination model. In addition, the recognition result provider 1320-4 may receive information regarding the situation determined by the server 2000 from the server 2000.

For example, the electronic apparatus 100 may transmit context data corresponding to an unable-to-move situation of the robot 1 to the server 2000, and may request the server 2000 to estimate the unable-to-move situation of the robot 1 by applying the context data to a data recognition model. In addition, the electronic apparatus 100 may receive information regarding the unable-to-move situation estimated by the server 2000 from the server 2000. Alternatively, the recognition result provider 1320-4 of the electronic apparatus 100 may receive a determination model generated by the server 2000 from the server 2000, and may determine a situation by using the received determination model. In this case, the recognition result provider 1320-4 of the electronic apparatus 100 may determine a situation by applying data selected by the recognition data selecting unit 1320-3 to a data recognition model received from the server 2000.

For example, the electronic apparatus 100 may estimate an unable-to-move situation of the robot 1 by applying context data corresponding to the unable-to-move situation of the robot 1 to a data recognition model received from the server 2000.

Certain aspects of the disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the disclosure can be easily construed by programmers skilled in the art to which the disclosure pertains.

At this point it should be noted that the various embodiments of the disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the disclosure as described above. Alternatively, one or more processors operating in accordance with stored instructions may implement the functions associated with the various embodiments of the disclosure as described above. If such is the case, it is within the scope of the disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the disclosure can be easily construed by programmers skilled in the art to which the disclosure pertains.

The embodiments may be described in terms of functional block components and various processing steps. Such functional blocks may be realized by any number of hardware and/or software components configured to perform the specified functions. For example, one or more embodiments may employ various integrated circuit components, e.g., memory elements, processing elements, logic elements, look-up tables, and the like, which may carry out a variety of functions under the control of one or more microprocessors or other control devices. As elements may be implemented using software programming or software elements, the embodiments may be practiced with any programming or scripting language, such as C, C++, Java, assembler, or the like, with the various algorithms being implemented with any combination of data structures, objects, processes, routines or other programming elements. Furthermore, the embodiments could employ any number of techniques for electronics configuration, signal processing and/or data processing and the like. The words 'mechanism', 'element', 'means', and 'configuration' may be used broadly and are not limited to mechanical or physical embodiments, but may include software routines in conjunction with processors, and the like.

What is claimed is:

1. An electronic apparatus comprising:
   a storage;
   at least one sensor; and
   at least one processor configured to execute stored instructions to:
   based on an unable-to-move situation occurring while the electronic apparatus is moving, generate context data comprising surrounding image data for a first surrounding image captured within a specified time from an occurrence time of the unable-to-move situation,
   store, in the storage, the generated context data,
   transmit the generated context data to a server,
   receive, from the server, one or more data recognition models in which a criterion for the unable-to-move situation is learned using the generated context data as learning data,
   while the electronic apparatus is moving, capture a second surrounding image using the at least one sensor,
   using the one or more data recognition models, determine whether or not surrounding image data for the second surrounding image matches the stored context data,
   when the surrounding image data matches the context data, estimate an occurrence of the unable-to-move situation corresponding to the matched context data, and
   control to avoid the occurrence of the unable-to-move situation.

2. The electronic apparatus of claim 1, wherein the at least one processor is further configured to execute the stored instructions to:
   generate a virtual image estimated to be obtained when a point where the unable-to-move situation corresponding to the context data occurred is approached from a different direction, based on the context data comprising the surrounding image data for the first surrounding image, using the one or more data recognition models, and
   store the context data further comprising the generated virtual image.

3. The electronic apparatus of claim 1, wherein the at least one processor is further configured to execute the stored instructions to:
   while the electronic apparatus is moving, obtain location information indicating a location of the electronic apparatus, using the at least one sensor, and
   based on the unable-to-move situation occurring while the electronic apparatus is moving, store, in the storage, the context data further comprising location information corresponding to a point where the unable-to-move situation occurred.

4. The electronic apparatus of claim 1, wherein the at least one processor is further configured to execute the stored instructions to:
   extract feature information from the surrounding image data for the first surrounding image comprised in the context data, using the one or more data recognition models, and
   store the context data further comprising the extracted feature information.

5. The electronic apparatus of claim 4, wherein the feature information comprises at least one of:
   identification information for identifying an object comprised in the first surrounding image;
   information regarding a relative distance and direction with respect to a point where a plurality of image frames have been captured and a point where the unable-to-move situation occurred; or
   path information indicating an estimated moving path estimated from the first surrounding image.

6. The electronic apparatus of claim 1, wherein the at least one processor is further configured to execute the stored instructions to:
   obtain entry point information comprising an image frame and location information corresponding to an entry point leading to a point where the unable-to-move situation occurred, based on the context data comprising the surrounding image data for the first surrounding image, using the one or more data recognition models, and
   store the context data further comprising the entry point information.

7. The electronic apparatus of claim 1, wherein the at least one processor is further configured to execute the stored instructions to:
   request the server to estimate the unable-to-move situation of the electronic apparatus by applying the context data to the one or more data recognition models,
   receive information about the unable-to-move situation estimated by the server, and
   based on the received information about the unable-to-move situation, control to avoid the occurrence of the unable-to-move situation.

8. The electronic apparatus of claim 1, wherein the at least one processor is further configured to execute the stored instructions to:
- based on estimating occurrence of the unable-to-move situation, obtain a relative distance and direction with respect to current location information of the electronic apparatus, based on location information of a point where the unable-to-move situation occurred, using the one or more data recognition models, wherein the location information is comprised in the matched context data, and
- based on the relative distance and direction, obtain a moving path for avoiding the unable-to-move situation.

9. The electronic apparatus of claim 1, wherein the at least one processor is further configured to execute the stored instructions to determine the unable-to-move situation as having occurred, when an image comprising a preset user gesture is obtained.

10. An operating method of an electronic apparatus, the method comprising:
- based on an unable-to-move situation occurring while the electronic apparatus is moving, generating context data comprising surrounding image data for a first surrounding image captured within a specified time from an occurrence time of the unable-to-move situation;
- storing the generated context data;
- transmitting the generated context data to a server;
- receiving, from the server, one or more data recognition models in which a criterion for the unable-to-move situation is learned using the generated context data as learning data;
- while the electronic apparatus is moving, capturing a second surrounding image;
- using the one or more data recognition models, determining whether or not surrounding image data for the second surrounding image matches the stored context data,
- when the surrounding image data matches the context data, estimating an occurrence of the unable-to-move situation corresponding to the matched context data; and
- controlling to avoid the occurrence of the unable-to-move situation.

11. The method of claim 10, further comprising:
- generating a virtual image estimated to be obtained when a point where the unable-to-move situation corresponding to the context data occurred is approached from a different direction, based on the context data comprising the surrounding image data for the first surrounding image, using the one or more data recognition models; and
- storing the context data further comprising the generated virtual image.

12. The method of claim 10, wherein controlling to avoid the occurrence of the unable-to-move situation comprises:
- requesting the server to estimate the unable-to-move situation of the electronic apparatus by applying the context data to the one or more data recognition model;
- receiving information about the unable-to-move situation estimated by the server; and
- based on the received information about the unable-to-move situation, controlling to avoid the occurrence of the unable-to-move situation.

13. A non-transitory computer readable storage medium storing instructions which, when executed by a processor of an electronic apparatus, configure the processor to perform operations comprising:
- based on an unable-to-move situation occurring while the electronic apparatus is moving, generating context data comprising surrounding image data for a first surrounding image captured within a specified time from an occurrence time of the unable-to-move situation;
- storing the generated context data;
- learning the stored context data using one or more data recognition models;
- while the electronic apparatus is moving, capturing a second surrounding image;
- using the one or more data recognition models, determining whether or not surrounding image data for the second surrounding image matches the stored context data;
- when the surrounding image data matches the context data, estimating an occurrence of the unable-to-move situation corresponding to the matched context data; and
- controlling to avoid the occurrence of the unable-to-move situation.

* * * * *